US011236841B2

(12) United States Patent
Krosschell et al.

(10) Patent No.: US 11,236,841 B2
(45) Date of Patent: Feb. 1, 2022

(54) VALVE CONTROL SYSTEM AND METHOD

(71) Applicant: Raven Industries, Inc., Sioux Falls, SD (US)

(72) Inventors: Justin Krosschell, Sioux Falls, SD (US); Travis Burgers, Sioux Falls, SD (US); Jacob Deines, Marshall, MN (US)

(73) Assignee: Raven Industries, Inc., Sioux Falls, SD (US)

( * ) Notice: Subject to any disclaimer, the term of this patent is extended or adjusted under 35 U.S.C. 154(b) by 0 days.

(21) Appl. No.: 17/001,539

(22) Filed: Aug. 24, 2020

(65) Prior Publication Data

US 2021/0102637 A1 Apr. 8, 2021

Related U.S. Application Data

(60) Provisional application No. 62/911,045, filed on Oct. 4, 2019.

(51) Int. Cl.
*F16K 31/06* (2006.01)
*A01C 23/04* (2006.01)

(52) U.S. Cl.
CPC ........ *F16K 31/0679* (2013.01); *A01C 23/047* (2013.01); *F16K 31/0655* (2013.01)

(58) Field of Classification Search
CPC F16K 31/0679; F16K 31/0655; A01C 23/047
See application file for complete search history.

(56) References Cited

U.S. PATENT DOCUMENTS

| 4,530,463 A | 7/1985 | Hiniker et al. |
| 4,803,626 A | 2/1989 | Bachman et al. |

(Continued)

FOREIGN PATENT DOCUMENTS

| AU | 2006202376 B2 | 12/2006 |
| AU | 2009203181 A1 | 2/2010 |

(Continued)

OTHER PUBLICATIONS

"U.S. Appl. No. 15/029,935, Final Office Action dated Jul. 11, 2017", 6 pgs.

(Continued)

*Primary Examiner* — Eric Keasel
(74) *Attorney, Agent, or Firm* — Schwegman Lundberg & Woessner, P.A.

(57) ABSTRACT

In an example, a system for applying an agricultural product includes a valve and a solenoid. For instance, the valve includes a coil that generates a magnetic flux. The system includes a valve controller. The valve controller is configured to measure one or more electrical characteristics of at least one of the coil or a dissipation element. In some examples, the valve controller determines an actual duty cycle of a valve operator of the valve using the measured electrical characteristics. The valve controller determines a magnetic flux correction, for instance based on a difference between the actual duty cycle and a specified duty cycle. The valve controller operates the valve operator according to the specified magnetic flux and the magnetic flux correction to guide the actual duty cycle toward the specified duty cycle.

20 Claims, 13 Drawing Sheets

(56) References Cited

U.S. PATENT DOCUMENTS

| | | | |
|---|---|---|---|
| 5,615,836 | A | 4/1997 | Graef |
| 5,653,389 | A | 8/1997 | Henderson et al. |
| 5,704,546 | A | 1/1998 | Henderson et al. |
| 5,772,114 | A | 6/1998 | Hunter |
| 5,913,915 | A | 6/1999 | McQuinn |
| 5,971,294 | A | 10/1999 | Thompson et al. |
| 6,070,538 | A | 6/2000 | Flamme et al. |
| 6,070,539 | A | 6/2000 | Flamme et al. |
| 6,079,340 | A | 6/2000 | Flamme et al. |
| 6,122,581 | A | 9/2000 | McQuinn |
| 6,189,807 | B1 | 2/2001 | Miller et al. |
| 6,216,614 | B1 | 4/2001 | Wollenhaupt |
| 6,230,091 | B1 | 5/2001 | McQuinn et al. |
| 6,522,948 | B1 | 2/2003 | Benneweis |
| 6,606,542 | B2 | 8/2003 | Hauwiller et al. |
| 6,678,580 | B2 | 1/2004 | Benneweis |
| 6,720,684 | B2 | 4/2004 | Czimmek |
| 6,776,355 | B2 | 8/2004 | Ringer et al. |
| 6,877,675 | B2 | 4/2005 | Benneweis |
| 7,124,964 | B2 | 10/2006 | Bui |
| 7,706,926 | B2 | 4/2010 | Peterson |
| 8,186,288 | B2 | 5/2012 | Chinkiwsky |
| 8,191,795 | B2 | 6/2012 | Grimm et al. |
| 8,488,874 | B2 | 7/2013 | Zaman et al. |
| 8,523,085 | B2 | 9/2013 | Grimm et al. |
| 8,634,993 | B2 | 1/2014 | McClure |
| 9,781,916 | B2 | 10/2017 | Preheim et al. |
| 10,058,879 | B2 * | 8/2018 | Needham .............. G05D 7/00 |
| 10,173,236 | B2 | 1/2019 | Preheim et al. |
| 10,189,031 | B2 | 1/2019 | Funseth et al. |
| 10,368,538 | B2 | 8/2019 | Preheim et al. |
| 2002/0107609 | A1 | 8/2002 | Benneweis |
| 2006/0273189 | A1 | 12/2006 | Grimm et al. |
| 2008/0114497 | A1 | 5/2008 | Giles et al. |
| 2008/0230624 | A1 | 9/2008 | Giles et al. |
| 2010/0032492 | A1 | 2/2010 | Grimm et al. |
| 2010/0101469 | A1 | 4/2010 | Landphair et al. |
| 2010/0163774 | A1 | 7/2010 | Rimboym et al. |
| 2011/0160920 | A1 | 6/2011 | Orr et al. |
| 2011/0179984 | A1 | 7/2011 | Beaujot et al. |
| 2012/0168530 | A1 | 7/2012 | Ellingson et al. |
| 2012/0169495 | A1 | 7/2012 | Kowalchuk |
| 2012/0174843 | A1 | 7/2012 | Friggstad |
| 2012/0195496 | A1 | 8/2012 | Zaman et al. |
| 2012/0211508 | A1 | 8/2012 | Barsi et al. |
| 2012/0216732 | A1 | 8/2012 | Ballard et al. |
| 2012/0228395 | A1 | 9/2012 | Needham |
| 2012/0271467 | A1 | 10/2012 | Grimm et al. |
| 2013/0320105 | A1 | 12/2013 | Schmidt |
| 2013/0320106 | A1 | 12/2013 | Schmidt |
| 2014/0263709 | A1 | 9/2014 | Kocer et al. |
| 2014/0277780 | A1 | 9/2014 | Jensen et al. |
| 2014/0299673 | A1 | 10/2014 | Grimm et al. |
| 2015/0336116 | A1 | 11/2015 | Gerdes |
| 2015/0367352 | A1 | 12/2015 | Burchardt |
| 2016/0015020 | A1 | 1/2016 | Needham et al. |
| 2016/0044862 | A1 | 2/2016 | Kocer et al. |
| 2017/0120263 | A1 | 5/2017 | Needham |
| 2017/0251656 | A1 | 9/2017 | Kolb et al. |
| 2017/0348718 | A1 | 12/2017 | Preheim et al. |
| 2018/0042214 | A1 | 2/2018 | Preheim et al. |
| 2019/0047694 | A1 | 2/2019 | Zivan et al. |
| 2019/0321844 | A1 | 10/2019 | Schrader et al. |
| 2020/0037519 | A1 | 2/2020 | Wonderlich et al. |
| 2020/0101480 | A1 | 4/2020 | Schrader et al. |
| 2021/0219538 | A1 | 7/2021 | Krosschell et al. |

FOREIGN PATENT DOCUMENTS

| | | |
|---|---|---|
| AU | 2013203361 A1 | 10/2013 |
| AU | 2013204455 A1 | 3/2014 |
| AU | 2017285727 B2 | 7/2020 |
| CA | 2549300 A1 | 12/2006 |
| CA | 2674527 A1 | 2/2010 |
| CA | 2811726 A1 | 10/2013 |
| CA | 2813949 A1 | 2/2014 |
| CA | 2926448 A1 | 4/2015 |
| CA | 2926448 C | 9/2020 |
| CN | 202255911 U | 5/2012 |
| CN | 203264929 U | 11/2013 |
| EP | 0963255 B1 | 10/2002 |
| EP | 0847307 B2 | 1/2003 |
| GB | 2322573 A | 9/1998 |
| JP | 2005161221 A | 6/2005 |
| WO | WO-9712688 A1 | 4/1997 |
| WO | WO-2013135430 A1 | 9/2013 |
| WO | WO-2015058091 A1 | 4/2015 |
| WO | WO-2017223252 A1 | 12/2017 |
| WO | WO-2021066962 A1 | 4/2021 |

OTHER PUBLICATIONS

"U.S. Appl. No. 15/029,935, Non Final Office Action dated Mar. 30, 2017", 21 pgs.

"U.S. Appl. No. 15/029,935, Notice of Allowance dated Aug. 29, 2017", 5 pgs.

"U.S. Appl. No. 15/029,935, Preliminary Amendment dated Apr. 15, 2016", 3 pgs.

"U.S. Appl. No. 15/029,935, Reponse filed Aug. 16, 2017 to Final Office Action dated Jul. 11, 2017", 11 pgs.

"U.S. Appl. No. 15/029,935, Response filed Jun. 15, 2017 to Non Final Office Action dated Mar. 30, 2017", 12 pgs.

"U.S. Appl. No. 15/629,696, Corrected Notice of Allowability dated Aug. 29, 2018", 4 pgs.

"U.S. Appl. No. 15/629,696, Corrected Notice of Allowability dated Dec. 7, 2018", 2 pgs.

"U.S. Appl. No. 15/629,696, Ex Parte Quayle Action dated May 3, 2018", 12 pgs.

"U.S. Appl. No. 15/629,696, Response filed Jul. 3, 2018 to Ex Parte Quayle Action dated May 3, 2018", 13 pgs.

"U.S. Appl. No. 15/629,696, Response to Examiner's Reasons for Allowance dated Nov. 13, 2018", 2 pgs.

"U.S. Appl. No. 15/703,818, Corrected Notice of Allowability dated Jul. 8, 2019", 2 pgs.

"U.S. Appl. No. 15/703,818, Non Final Office Action dated Oct. 11, 2018", 6 pgs.

"U.S. Appl. No. 15/703,818, Notice of Allowance dated Mar. 20, 2019", 5 pgs.

"U.S. Appl. No. 15/703,818, Preliminary Amendment filed Nov. 3, 2017", 6 pgs.

"U.S. Appl. No. No. 15/703,8181, Response filed Jan. 11, 19 to Non Final Office Action dated Oct. 11, 2018", 9 pgs.

"U.S. Appl. No. 16/447,779, Corrected Notice of Allowability dated May 26, 2021", 2 pgs.

"U.S. Appl. No. 16/447,779, Non Final Office Action dated Jan. 12, 2021", 9 pgs.

"U.S. Appl. No. 16/447,779, Notice of Allowance dated May 20, 2021", 5 pgs.

"U.S. Appl. No. 16/447,779, Preliminary Amendment filed Dec. 30, 2019", 4 pgs.

"U.S. Appl. No. 16/447,779, Response filed Apr. 12, 2021 to Non Final Office Action dated Jan. 12, 2021", 7 pgs.

"Application Serial No. PCT/US2014/061150, International Preliminary Report on Patentability dated Oct. 16, 2015", 10 pgs.

"U.S. Appl. No. 15/629,696, Notice of Allowance dated Aug. 13, 2018", 5 pgs.

"Australian Application Serial No. 2017285727, First Examination Report dated May 21, 2019", 2 pgs.

"Australian Application Serial No. 2017285727, Response filed Mar. 23, 2020 to First Examination Report dated May 21, 2019", 10 pgs.

"Brazilian Application Serial No. 1120160085175, Office Action dated Mar. 25, 2020", (w/English Translation), 6 pgs.

"Brazilian Application Serial No. 1120160085175, Office Action dated Nov. 6, 2018", (w/English Translation), 6 pgs.

"Brazilian Application Serial No. 1120160085175, Response filed Jul. 27, 2020 to Office Action dated Mar. 25, 2020", (w/ English Translation of Claims), 103 pgs.

(56) References Cited

OTHER PUBLICATIONS

"Brazilian Application Serial No. 1120180747017, Office Action dated Jul. 22, 2021", 5 pgs.
"Brazilian Application Serial No. 1120180747017, Voluntary Amendment filed Jun. 22, 2020", (w/ English Translation), 44 pgs.
"Canadian Application Serial No. 2.926.448, Examiner's Rule 30(2) Requisition dated Jul. 23, 2019", 3 pgs.
"Canadian Application Serial No. 2,926,448, Examiner's Rule 30(2) Requisition dated Oct. 3, 2018", 3 pgs.
"Canadian Application Serial No. 2,926,448, Office Action mailed Jan. 5, 2018", 5 pgs.
"Canadian Application Serial No. 2,926,448, Response filed Mar. 19, 2019 to Examiner's Rule 30(2) Requisition dated Oct. 3, 2018", 7 pgs.
"Canadian Application Serial No. 2,926,448, Response filed Jun. 26, 2018 to Office Action dated Jan. 5, 2018", 19 pgs.
"Canadian Application Serial No. 2,926,448, Response filed Dec. 11, 2019 to Examiner's Rule 30(2) Requisition dated Jul. 23, 2019", 4 pgs.
"Canadian Application Serial No. 3,013,670, Examiner's Rule 30(2) Requisition dated Sep. 11, 2019", 5 pgs.
"Canadian Application Serial No. 3,013,670, Response filed Mar. 11, 2020 to Examiner's Rule 30(2) Requisition dated Sep. 11, 2019", 68 pgs.
"German Application Serial No. 11 2027 003 084.6, Office Action dated Feb. 5, 2019", (w/English Translation), 5 pgs.
"German Application Serial No. 11 2017 003 084.6, Response filed May 8, 2019 to Office Action dated Feb. 5, 2019", 16 pgs.
"International Application Serial No. PCT/US2014/061150, International Search Report mailed Feb. 4, 2015", 2 pgs.
"International Application Serial No. PCT/US2014/061150, Written Opinion dated Feb. 4, 2015", 7 pgs.
"International Application Serial No. PCT/US2017/038622, International Preliminary Report on Patentability dated Jan. 3, 2019", 7 pgs.
"International Application Serial No. PCT/US2017/038622, International Search Report mailed Sep. 28, 2017", 2 pgs.
"International Application Serial No. PCT/US2017/038622, Written Opinion dated Sep. 28, 2017", 5 pgs.
"International Application Serial No. PCT/US2020/047696, International Search Report dated Nov. 23, 2020", 2 pgs.
"International Application Serial No. PCT/US2020/047696, Written Opinion dated Nov. 23, 2020", 4 pgs.
"International Application Serial No. PCT/US2021/026252, International Search Report dated Jun. 15, 2021", 2 pgs.
"International Application Serial No. PCT/US2021/026252, Written Opinion dated Jun. 15, 2021", 4 pgs.
Bevly, David M, et al., "Carrier-Phase Differential GPS for Control of a Tractor Towed Implement", Proceedings of the 13th International Technical Meeting of the Satellite Division of The Institute of Navigation (ION GPS 2000), (2000), 2263-2268.
Van Zuydam, R. P, "A driver's steering aid for an agricultural implement, based on an electronic map and Real Time Kinematic DGPS", Computers and Electronics in Agriculture, 24(3), (Dec., 1999), 153-163'.
Van Zuydam, R. P, "Centimeter-Precision Guidance of Agricultural Implements In the Open Field by Means of Real Time Kinematic Dgps", Proceedings of the Fourth International Conference on Precision Agriculture, (1999), 1023-1034.
"Canadian Application Serial No. 3,049,391, Office Action dated Dec. 1, 2021", 4 pgs.
"Canadian Application Serial No. 3,049,421, Office Action dated Nov. 29, 2021", 4 pgs.
"U.S. Appl. No. 16/476,016, Response filed Nov. 29, 2021 to Non-Final Office Action dated Aug. 31, 2021", 19 pgs.
"U.S. Appl. No. 16/476,069, Non-Final Office Action dated Nov. 12, 2021", 13 pgs.
"U.S. Appl. No. 17/410,852, Preliminary Amendment dated Dec. 10, 2021", 8 pgs.
"Brazilian Application Serial No. 1120180747017, Response filed Oct. 20, 2021 to Office Action dated Jul. 22, 2021", (w/ English Translation of Claims), 56 pgs.
"Canadian Application Serial No. 3,049,421, Response filed Oct. 1, 2021 to Office Action dated Jun. 4, 2021", 33 pgs.
"European Application Serial No. 18735853.6, Response filed Oct. 28, 2021 to Communication Pursuant to Article 94(3) EPC dated Jun. 18, 2021", 17 pgs.

\* cited by examiner

VALVE CONTROL SYSTEM AND METHOD

CLAIM OF PRIORITY

This patent application claims the benefit of priority of Krosschell et al. U.S. Provisional Patent Application Ser. No. 62/911,045, entitled "VALVE CONTROL SYSTEM AND METHOD," filed on Oct. 4, 2019, which is hereby incorporated by reference herein in its entirety.

TECHNICAL FIELD

This document pertains generally, but not by way of limitation, to agricultural equipment.

BACKGROUND

An agricultural product (e.g., a fertilizer, carrier fluid, or the like) is optionally applied to a crop (e.g., one or more plants located in a farm field). In some examples, the agricultural product is applied with a sprayer system, for instance a sprayer mounted on a prime mover (e.g., a tractor, truck, all-terrain-vehicle, or the like). The sprayer system includes a valve, and the valve facilitates application of agricultural product to the crop (e.g., by spraying the agricultural product from a nozzle). In some examples, the valve is operated by a controller, for instance to translate the valve between an open position and a closed position. In the open position, the valve permits flow of the agricultural product through the valve. In the closed position, the valve does not permit flow of the agricultural product through the valve (e.g., between a valve inlet and a valve outlet). In some examples, the controller modulates the valve according to a duty cycle. The valve opens closes) in correspondence to the duty cycle of the modulation provided by the controller.

OVERVIEW

The present inventors have recognized, among other things, that a problem to be solved can include accurately applying an agricultural product to a crop. In an example, a valve controls the flow of a fluid through the valve. The valve is included in a sprayer system that applies the agricultural product to the crop (e.g., by spraying the agricultural product from a nozzle). In some examples, the valve is operated by a controller, for instance to translate the valve between an open position and a closed position. In the open position, the valve permits flow of the agricultural product through the valve. In the closed position, the valve does not permit flow of the agricultural product through the valve (e.g., between a valve inlet and a valve outlet).

In an example, the valve is operated for a specified duty cycle. The specified duty cycle optionally corresponds to a time duration between a first time interval when the controller modulates the valve (e.g., by generating a control signal) and a second time interval when the controller stops modulating the valve (e.g., by stopping the generation of the control signal). An actual duty cycle of the valve differs from the specified duty cycle for the valve. For instance, the mechanical response of the valve (e.g., to begin translating the valve toward the open position from the closed position) to the modulation provided by the controller does not perfectly correspond in time to when the controller intends for the valve to modulate. In an example, the actual duty cycle of the valve corresponds to a time duration between a third time interval when the valve actually begins transitioning between the open position and the closed position, and a fourth time interval when the valve actually completes the transition between the open position and the closed position. Accordingly, the specified duty cycle corresponds to a time duration that the controller modulates the valve (e.g., the time duration that the controller generates a control signal, or the like). The actual duty cycle of the valve corresponds to the time duration that the valve is in an open position (e.g., when a seal is disengaged from a valve seat to allow flow through the valve) in response to the modulation provided by the controller. The actual duty cycle varies from the specified duty cycle, for example due to mechanical tolerances of the valve, operating conditions (e.g., high pressure as opposed to low pressure), inertia of mechanical components of the system, signal processing delays or the like.

In some examples, the valve is operated to deliver a specified amount of agricultural product (e.g., a specified volume, specified flow rate, or the like) through the valve. In some approaches, an actual amount of agricultural fluid flowing through the valve differs from the specified amount because of differences between the specified duty cycle and the actual duty cycle of the valve. Accordingly, in some approaches the agricultural fluid is misapplied to the crop (e.g., too much agricultural product, too little agricultural product, or the like), and the misapplication affects one or more characteristics of the crop (e.g., growth, development, yield or the like).

The present subject matter can help provide a solution to this problem, such as by providing a system for applying agricultural product. The system includes a valve, and the valve optionally includes a solenoid having a coil configured to generate a magnetic flux. In some examples, the valve includes a moveable valve operator, and the valve operator translates with respect to the coil based on the generated magnetic flux. The valve operator optionally translates between a closed position and an open position according to a specified magnetic flux associated with a specified duty cycle, for instance the valve (ideally) opens with application of the magnetic flux and closes with arresting of the magnetic flux. In an example, the valve operator prevents flow through the valve in closed position, and the valve operator permits flow through the valve in the open position.

In an example, the system includes a dissipation element, such as a transient voltage suppression diode ("TVS"), having a dissipation characteristic (e.g., an amount of energy dissipated in proportion to a voltage across the dissipation element). In some examples, the dissipation element dissipates energy from the coil to arrest the magnetic flux and thereby initiate a rapid closing of the valve operator. For instance, a clamping voltage of a coil is increased and the energy in the coil (the increased voltage) is readily dissipated with the TVS. The dissipated energy corresponding initiates a rapid drop off in current and thereby decreases the magnetic flux that is based on current.

In some examples, the system includes a controller, and the controller receives measurements of one or more electrical characteristics of at least one of the coil or the dissipation element. The controller optionally determines an actual duty cycle of the valve operator using the measured electrical characteristics through flux and electrical characteristics caused by movement of the operator relative to the coil). In an example, the controller determines a magnetic flux correction (e.g., for the coil, or the like) based on a difference between the actual duty cycle and the specified duty cycle of the valve operator. The controller optionally operates the valve operator according to the specified magnetic flux and the magnetic flux correction to guide the actual duty cycle of the valve operator toward the specified duty cycle of the valve operator.

Accordingly, the system for applying an agricultural product facilitates accurate and precise application of the agricultural product to a crop. For example, the controller guiding the actual duty cycle of the valve operator toward the specified duty cycle increases the accuracy (and precision) of an amount of agricultural fluid to the crop. For example, the system facilitates the application of a specified amount of agricultural product at a specified location (and/or at a specified time). Accordingly, agricultural product is accurately and precisely applied to the crop, for example to improve one or more crop characteristics (e.g., growth, development, yield or the like) and minimize waste of the agricultural product (e.g., waste due to misapplication).

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
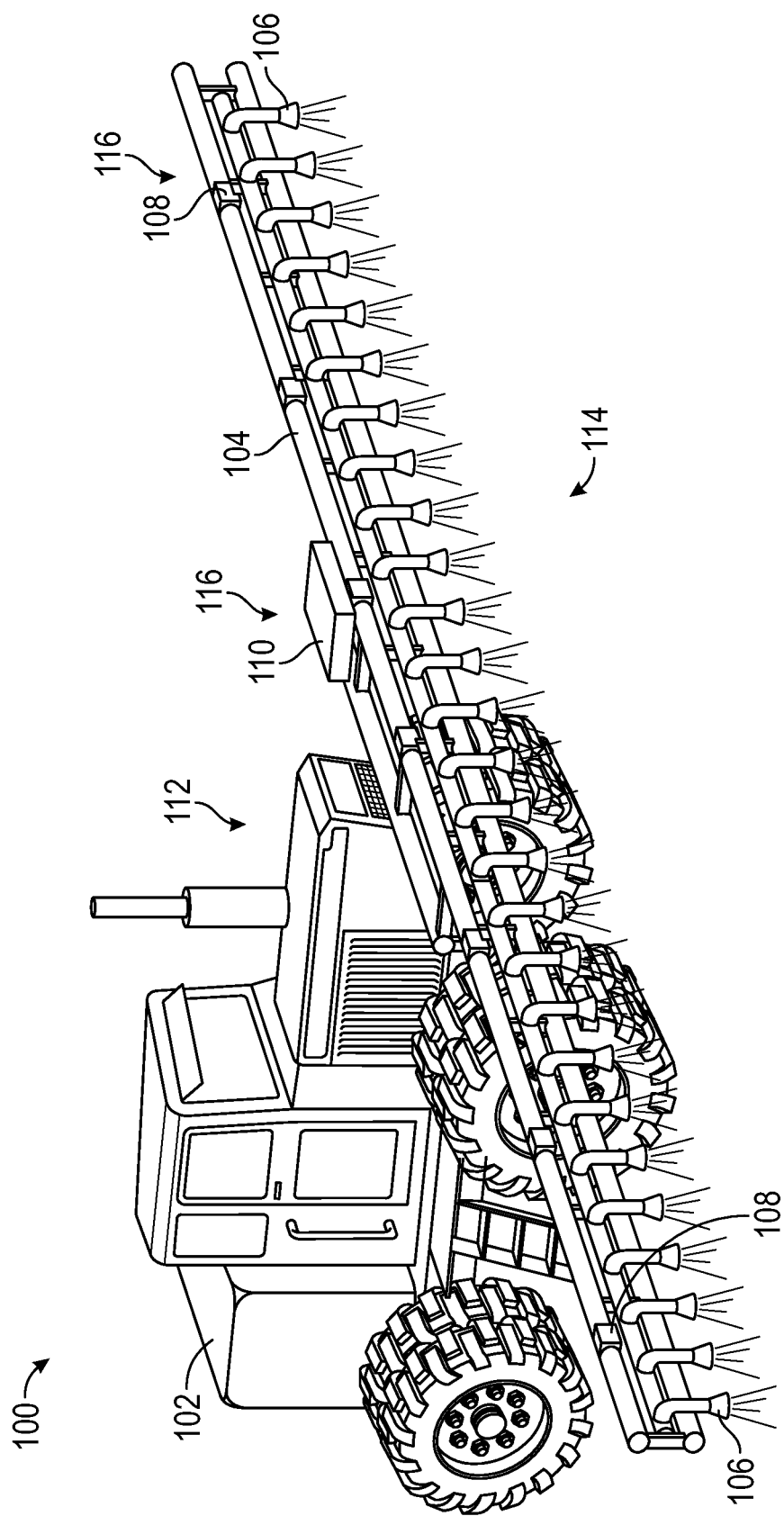
FIG. 1 illustrates a perspective view of an example of an agricultural sprayer.

FIG. 1 illustrates a perspective view of an example of an agricultural sprayer 100. In an example, the agricultural sprayer 100 includes a reservoir tank 102 and one or more sprayer booms 104. The sprayer booms 104 optionally include one or more nozzles 106. In some examples, the agricultural sprayer 100 includes one or more electronic control units (ECU) 108 (e.g., a microprocessor based system), and for instance a master node 110. (e.g., a microprocessor based system)

In an example, the reservoir tank 102 is integral with a prime mover 112 (e.g., a tractor, truck, combine, vehicle, or the like). In some examples, the reservoir tank 102 is a towed behind the prime mover 112 (e.g., the reservoir tank 102 is included with a trailer, or the like). The reservoir tank 102, in an example, includes an agricultural product mixed with a carrier fluid, such as water. In some examples, the carrier fluid and the agricultural product are mixed in-line prior to or at the sprayer boom 104. The nozzles 106 are positioned along the sprayer boom 104 to deliver the agricultural product (and the carrier fluid) to a crop (e.g., vegetables, fruit feed, or the like), for instance a crop located in an agricultural field 114. Crops include, but are not limited to, any product grown in an agricultural field, such as row and non-row based crops. Agricultural products include, but are not limited to, fertilizers, water, pesticides, fungicides, herbicides, or the like.

The agricultural sprayer 100 includes one or more controllers 116, for example the ECU 108 and the master node 110. In an example, the master node 110 operates in conjunction with the one or more ECU 108 to control delivery of the agricultural product from the reservoir tank 102, to the sprayer boom 104 and the associated nozzles 106 for delivery to the agricultural field or crop.

Figure 2:
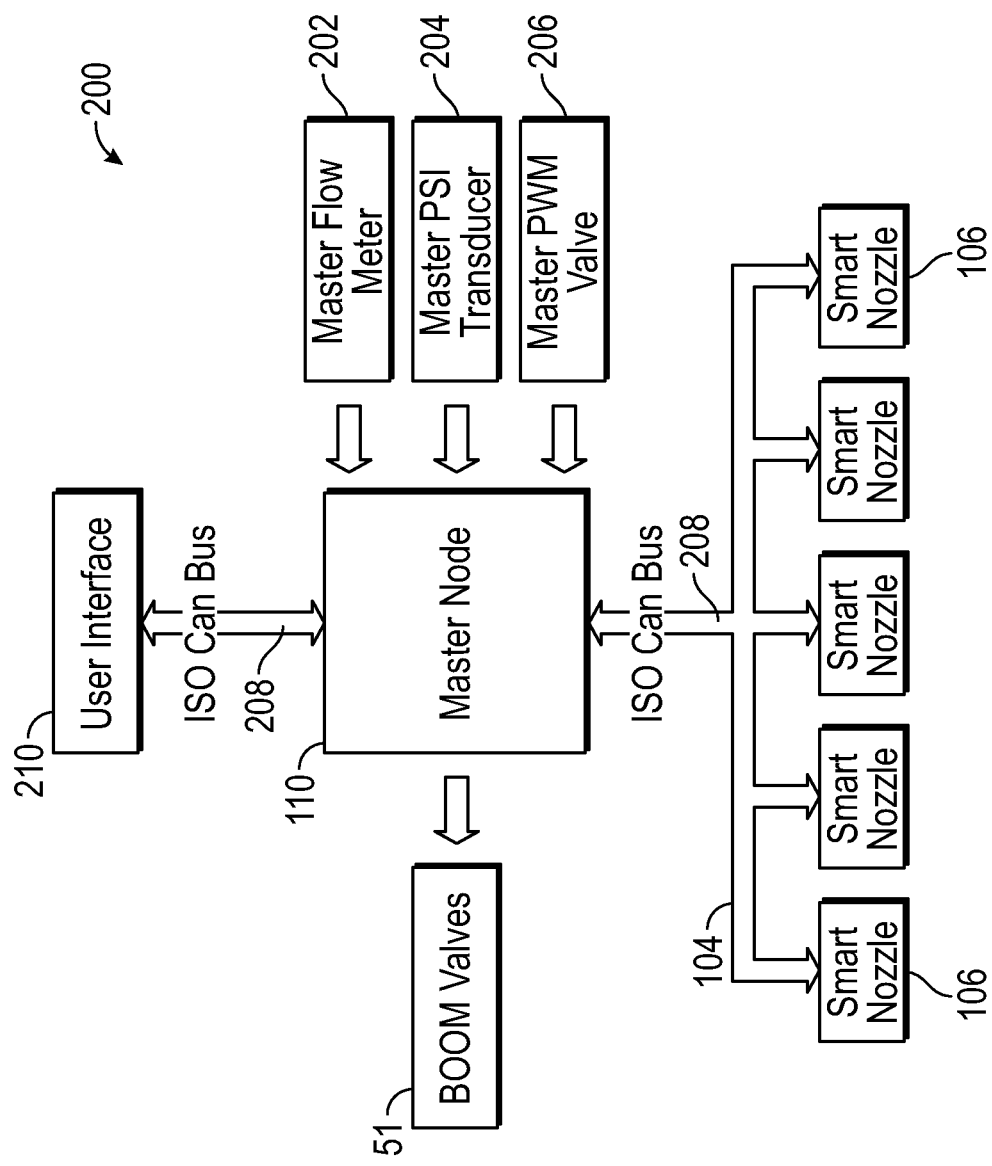
FIG. 2 illustrates a schematic of an exemplary nozzle control system.

FIG. 2 illustrates a schematic of an exemplary nozzle control system 200, wherein the one or more nozzles 106 located on the boom 104 control a respective nozzle flow rate of an agricultural product dispensed from the nozzle 106. As shown in FIG. 2, the master node 110 is communicatively coupled to one or more valves (e.g., the PWM valve 206) of the boom 104, such that system pressure within the boom 104 can be controlled by the master node 110. In some examples, the master node 110 of the current system is not configured to control the flow rate within the system 200, boom 104, or at the smart nozzles 106. Instead, the master node 110 controls the pressure within the system 200, boom 104, or at the smart nozzles 106, and the pressure control provides control of the flow rate (e.g., control to a lower pressure decreases flow while control to a higher pressure increases flow). The master node 110 is in communication with a master flowmeter 202, a master pressure transducer 204, and a master pulse width modulation (PWM) valve 206. The master node 110 controls the master PWM valve 206 to provide a targeted system pressure (through modulated operation of a system pump associated with the master PWM valve 206), such that a desired droplet size of the agricultural product is generated at the nozzles 106. For example, environmental conditions, such as wind, humidity, rain, temperature, field characteristics, or user preference determine whether a smaller or larger droplet size of the agricultural product is preferred. By controlling a targeted system pressure (e.g., maintaining, changing with variations in flow rate or the like), the preferred droplet size is maintained with the system 200.

In the exemplary embodiment, each of the nozzles 106 is a smart nozzle that includes an electronic control unit (ECU) (e.g., ECU 108, shown in FIG. 1 or the like) that regulates, determines, and/or controls the nozzle flow rate of the agricultural product dispensed from the nozzle 106, as discussed in reference to FIG. 3. In other embodiments, a group of the nozzles 106 are associated with a common ECU and is collectively considered a single smart nozzle. The smart nozzles 106 are connected to, for example, the boom 104 and communicatively coupled to a controller area network (e.g., nozzle CAN bus 208, wireless network or the like) of the overall control system 200. As discussed herein, the CAN bus 208 is configured to distribute overall system information from the master node 110 (e.g., master node). The ECU at each smart nozzle 106 uses data from the overall system information to regulate, determine, and/or control the nozzle flow rate of each corresponding smart nozzle 106.

The master node 110 controls one or more of a system pressure or system flow rate using, for example, the master pressure transducer 204 (or in other examples the flow meter, flow meter and pressure transducer together or the like) and the master pulse width modulation (PWM) valve 206. Although FIG. 2 illustrates a PWM valve as a master valve 206, embodiments are not so limited. For example, the master valve 206 includes any valve capable of controlling pressure or flow rate of a system, such as a ball valve, PWM valve, butterfly valve or the like. For instance, the master node 110 maintains the system pressure or flow rate at a target system value (e.g., a target system pressure or target system flow rate). In another example, each smart nozzle 106 controls the component flow rate to the constituent nozzles associated with each smart nozzle. In another example, the master node controls the system pressure or system flow rate to one or more target values and the smart nozzles 106 control the flow rate for each of the constituent nozzles (e.g., one or more) associated with each smart nozzle. Collectively, the smart nozzles 106 may control the overall agricultural product flow rate of the system.

In an example, the target system pressure is provided by a user, such as at the user interface 210 connected to the master node 110 by the nozzle CAN bus 208. In an additional example, the user also provides a target system flow rate (e.g., volume/area) at the user interface 210. In an example, the master node 110 provides one or more of the target system flow rate or the target system pressure to each of the one or more smart nozzles 106, such that each smart nozzle 106 (or each ECU, as discussed herein) determines an individual agricultural product flow rate (or pressure) for the smart nozzle 106. For example, the system target flow rate is divided by the number of nozzles 106 to provide a target agricultural product flow rate for each of the one or more nozzles 106. In an example, the master node 110 measures the flow rate (e.g., volume per time) with a master flow meter 202 and compares it with the overall target flow rate (e.g., designated by one or more of the user, crop type, soil characteristic, agricultural product type, historical data, or the like). The master node 110 is configured to determine a difference or error, if present, between the measured system flow rate and the target system flow rate. In such an example, the master node 110 provides the determined difference, by the nozzle CAN bus 208, to the individual nozzles 106 (or ECUs, as discussed herein). The one or more nozzles 106 receive the difference on the CAN bus 208 and adjust their pressure/flow/duty cycle curve using the difference (e.g., compensating for errors in the system) to reduce the error between the measured and target system flow rates (or reduce the error between the measured and target system pressures).

Additionally, in at least some examples, the master node 110 reports the actual pressure, measured by the master pressure transducer 204, as well as boom 104 information, including, but not limited to, one or more of yaw rate, speed, number of smart nozzles of the boom, distance between smart nozzles on the boom, to the smart nozzles 106 (or ECUs, as described herein) for individual flow rate control (or pressure control) of each of the smart nozzles 106. For example, the information provided from the master node 110 is used in addition to nozzle characteristics to control the individual flow rate control of each smart nozzle 106. Nozzle characteristics include, but are not limited to nozzle position on a boom, length of the boom, nozzle spacing, target flow rate for the system, yaw rate of the boom, yaw rate of the agricultural sprayer, speed of the agricultural sprayer, the overall system pressure or flow rate, agricultural product characteristics, valve performance such as a moveable valve operator transition time (including differences between specified and actual duty cycles), or the like.

The system 200 is configured for installation on an agricultural sprayer (e.g., the agricultural sprayer 100, shown in FIG. 1). In operation, because the sprayer moves during operation (translates and rotates, accelerates or the like), the one or more nozzle characteristics, in an example, are dynamic and flow rates through nozzles associated with a smart nozzle 106 dynamically change in some examples relative to other smart nozzles 106 of the system.

FIG. 3 illustrates a detailed schematic view of an exemplary nozzle control system 300. The control system 300 includes the master node 110 communicatively coupled to one or more valves of the boom 104, such that system pressure within the boom 104 can be controlled by the master node 110. Further, the master node 110 includes inputs from one or more of the master flowmeter 202, the master pressure transducer 204, and the master pulse width modulation (PWM) valve 206. Further, as described herein, the master node 110 is coupled to the user interface 210 and, in an example, a battery 302, so as to provide power to one or more of the master node 110 and user interface 210.

As shown in the embodiment of FIG. 3, a smart nozzle 106 optionally includes an ECU 108 coupled to a valve 304 (e.g., a PWM valve, ball valve, butterfly valve, or the like). That is, FIG. 3 illustrates 36 ECUs relating directly to 36 nozzles of the nozzle control system 300, but embodiments are not so limited. The master node 110 is communicatively coupled, by nozzle CAN bus 208 to ECU-18 and ECU-19, wherein ECU-18 108 and ECU-19 108 define a center region of the boom. From the center region of the boom, the ECUs 108 are communicatively coupled to the most proximate ECU 108 in the direction toward each terminal end 306 of the boom. That is, ECU-18 is communicatively couple to ECU-17, which is communicatively coupled to ECU-16, and so forth until the terminator after ECU-1 is reached. The same pattern holds for the other half of the boom. Although 36 ECUs 72 are illustrated, embodiments are not so limited.

Further, as shown in FIG. 3, each ECU 108 is coupled to one PWM valve 304, however, embodiments are not so limited. In another example, a single ECU 108 is communicatively coupled to more than one PWM valve 304. For instance, a single ECU 108 is communicatively coupled to more than one valve, such as every other valve, arrays of valves along portions of booms or the like. In an example, 12 ECUs split control of the 36 nozzles of the boom. In an example, a plurality of nozzles are partitioned into nozzle groups, such that each nozzle group includes an ECU 108 configured to control a nozzle group flow rate (or nozzle pressure that in turn controls flow) of the agricultural product dispensed from each nozzle of the nozzle group (by way of associated control valves) based on the nozzle characteristics, as described herein, of the respective nozzles. Thus, a smart nozzle includes, but is not limited to, a single nozzle, an associated valve and an associated ECU. In another example, a smart nozzle includes a group of nozzles (having associated valves) that are associated with a common ECU.

In still another example, the system 300 includes one or more location fiducials associated with the system 300, the one or more location fiducials are configured to mark the location of one or more nozzles (or ECUs) of the plurality of nozzles on a field map (e.g., indexed with product flow rates, moisture content, crop type, agricultural product type, or the like). Optionally, each of the nozzles, nozzle groups, or ECUs 108 of the system is configured to control the agricultural product at individual rates according to the location of the one or more nozzles (or ECUs 108), the movement of the one or more nozzles relative to the field, another frame of reference or the like (and optionally in addition to the nozzle characteristics described herein). Further, each of the plurality of nozzles (or ECUs 108) is optionally cycled, such as on/off, according to the location of the nozzle (or location of a nozzle group or ECU 108) relative to a frame of reference, such as a field.

In an example, each nozzle ECU 108 is programmable to receive, track, or manipulate designated nozzle control factors (e.g., the specified duty cycle, the actual duty cycle, or the like). For example, each ECU 108 monitors one or more of nozzle spacing, target flow rate for the system, target pressure for the system, speed of the agricultural sprayer, yaw rate, nozzle location on the field, or the like. Such examples provide the benefit of comporting the system to user specifications, provide greater programmability of the system, and providing cost effective nozzle specific flow rate solutions. In yet another example, the ECUs 108 associated with each nozzle are instead consolidated into one or more centralized nodes that determine the individual flow rates of each of the respective nozzles in a similar manner to the previously described ECUs 108 associated with each of the nozzles.

The controllers 116 (e.g., the ECU 108, the master node 110, or the like) control the nozzle flow rate (or the timing of flow through the nozzle) based on a number of parameters, including, but not limited to: speed of the sprayer or boom, yaw rate, target system flow rate (e.g. volume/area), and on/off command at runtime. Such parameters permit the controllers 116 to calibrate the duty cycle curve (e.g., by adjusting the actual duty cycle of a valve) of each smart nozzle needed to achieve the target nozzle flow rate (or a target nozzle timing) of each of the smart nozzles. For instance, calibrating the duty cycle curve includes guiding an actual duty cycle of the nozzles (and their associated valves) to a specified duty cycle of the nozzles. Each smart nozzle is further configured according to nozzle spacing on the boom, location on the boom, and nozzle type. Further, in some examples, each smart nozzle regulates or controls the nozzle flow rate (or pressure) based on the location of the nozzle in the field (as described above).

Figure 3:
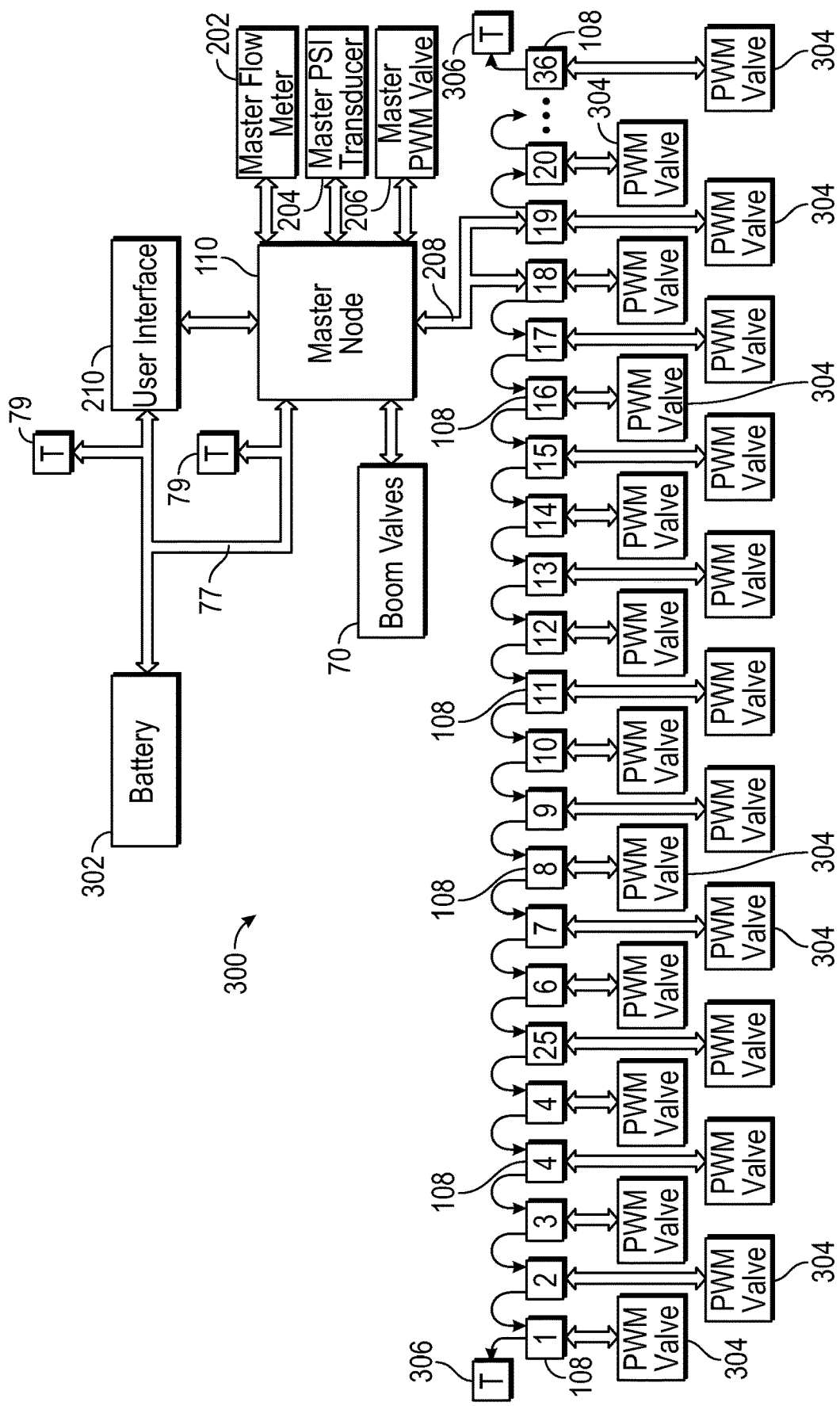
FIG. 3 illustrates a detailed schematic view of an exemplary nozzle control system.

As described herein, the agricultural sprayer 100 (shown in FIG. 1) includes a nozzle control system including a plurality of nozzles 106 having one or more associated valves 304 (e.g., such as a PWM solenoid valve as shown in FIG. 3, or the like) that regulate flow in order to provide a specified target application of an agricultural product from the nozzles 106. As a plurality of nozzles 106 are used across the boom 104 (shown in FIG. 1), achieving specified flow performance for each of the nozzles 106 enhances application precision and accuracy while minimizing application errors (e.g., misapplication, underapplication, overapplication, or the like). In some examples, one or more factors cause inconsistency in nozzle flow and droplet size (e.g., the size of droplets of agricultural product dispensed by the nozzle 106) of the sprayed agricultural product. Examples of these factors include, but are not limited to voltage drop of a solenoid drive voltage due to chassis wiring resistance, manufacturing tolerances of the mechanical elements in a valve itself (e.g., the valve 304, shown in FIG. 3), valve wear, valve contamination from the agricultural product, pressure variations across the boom or boom sections, variation due to an installed tip on the outlet of the nozzle, or open-stroke and close-stroke transition times for a moveable valve operator within the valve 304 controlling flow to the nozzle 106.

In an example, and as described in greater detail herein, a system for applying an agricultural product (e.g., the sprayer 100, or the like) realizes specified operational flow performance out of a smart nozzle 106 despite factors that negatively affect performance by determining variations between the specified performance and the actual performance and instituting a correction (or corrections) at valves to achieve the specified performance. For instance, the system controls a specified duty cycle of a valve versus an actual duty cycle of the valve 304 with a correction (discussed herein) that guides the actual duty cycle to coincide with the specified duty cycle. In some examples the system includes a solenoid valve drive circuit and a solenoid valve monitoring circuit. In another example, the system includes (or utilizes) an algorithm for tracking a position of a moveable valve operator (e.g., a poppet, or the like) of the valve 304 based on, for example, monitoring of back-emf (BEMF) generated in a solenoid coil by the moving valve operator as it transitions between its open and closed positions in the valve 304. In another example, monitoring (e.g., capturing, recording, observing, cataloging, compiling, collecting, or the like) of the performance of the valve 304 optionally provides insight into valve health or nozzle faults and, for instance alerts a system user to a specific problem (e.g., with the user interface 210, shown in FIG. 2).

Figure 4:
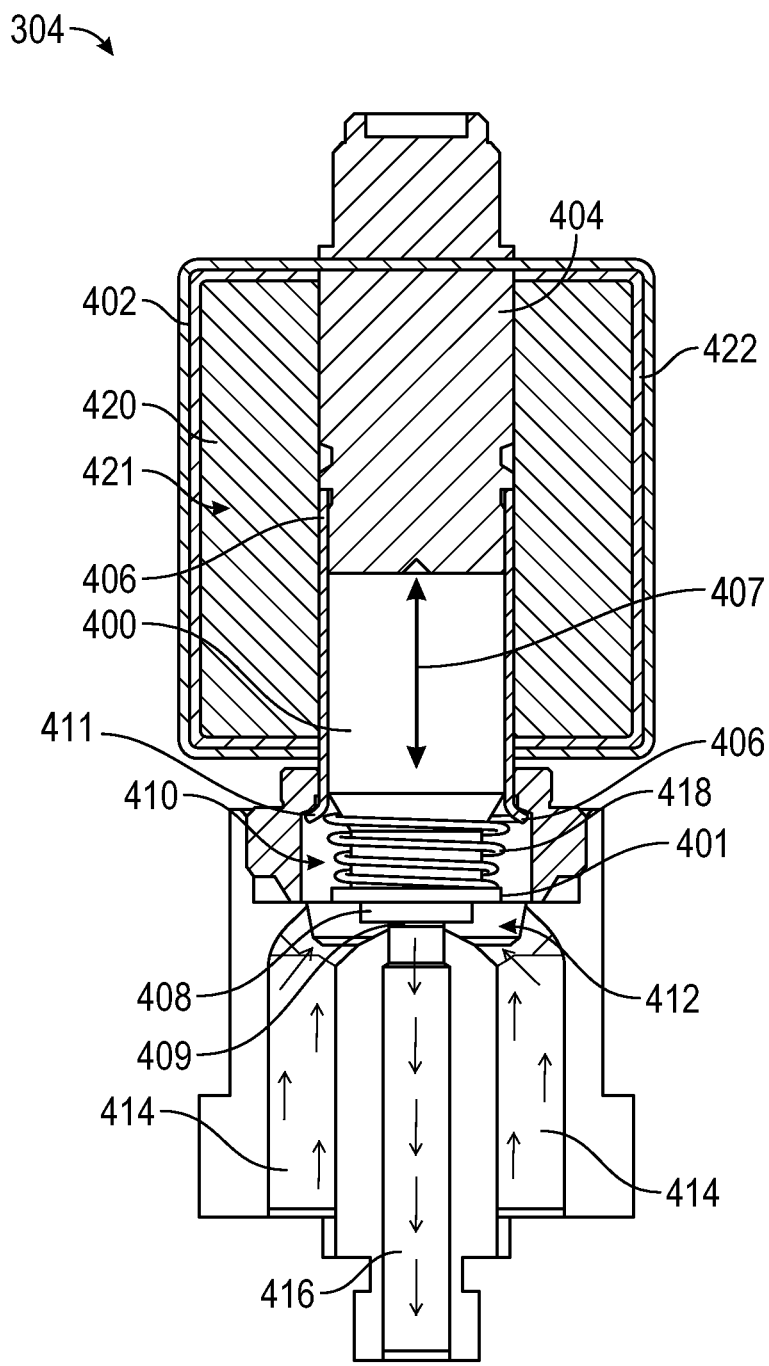
FIG. 4 illustrates an example of a valve, according to an embodiment of the present subject matter.
Figure 5:
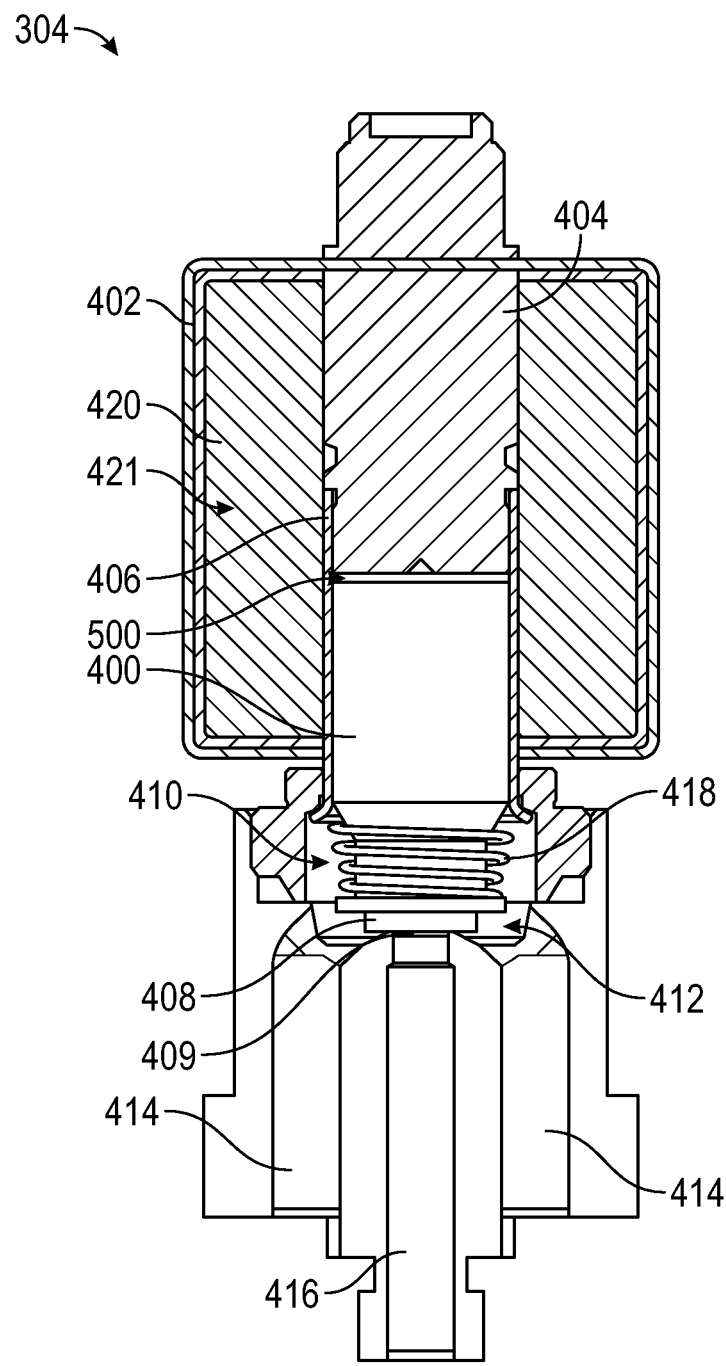
FIG. 5 illustrates an example of a valve, according to an embodiment of the present subject matter.

FIG. 4 and FIG. 5 illustrate sectional views of an example of the valve 304 in an open position and a closed position, respectively. The valve 304 is optionally a solenoid valve, for instance an electro-mechanical device that opens and closes an orifice by moving a moveable valve operator 400 (e.g., a poppet, gate, or the like) in a valve body 402 (e.g., a pressure vessel, frame, or the like). In an example, the valve body 402 of the valve 304 contains a lug 404 (e.g., a ferromagnetic material) and a housing 406 (e.g., a non-ferromagnetic material) that is connected to the lug 404. The valve operator 400 is movable in the housing 406, for instance with a range of motion 407 to open and close the valve. The valve operator 400 includes a seal 408 (e.g., a gasket, membrane or the like) coupled with a first end 410 of the valve operator 400. In an example, movement of the valve operator 400 within the housing 406 selectively opens and closes a channel 412 between a valve inlet 414 and a valve outlet 416. For example, the seal 408 engages with a valve seat 409 (shown in the closed configuration in FIG. 5) thereby inhibiting flow through the channel 412. In the open position, the seal 408 is disengaged from the seat 409 (as shown in FIG. 4) thereby allowing flow through the channel 412 (e.g., because the valve operator 400 is moved away from the seat 409). FIG. 4 includes arrows indicating flow within the valve inlet 414 and the valve outlet 416.

In an example, the valve 304 is biased toward the closed position, for instance with a biasing element 418, such as a coil spring, leaf spring, elastomer, magnet, or the like. The biasing element 418 optionally biases the valve operator 400 toward the closed position. In an example, the moveable valve operator 400 includes an operator flange 401 and the housing 406 includes a flare 411 The biasing element 418 (a spring in this example) is coupled between the operator flange 401 and the flare 411. In this example, the biasing element 418 provides a force between the housing 406 and the valve operator 400 to bias the valve operator 400 toward the closed position.

In some examples, the valve 304 operates by applying a voltage potential to a coil 420 (e.g., a winding of wire, or the like) that generates current in the coil 420. The coil 420 generates magnetic flux when current flows through the coil 420. In an example, the moveable valve operator 400 translates with respect to the coil 420 based on the magnetic flux generated by the coil 420. The current flowing through the coil 420 optionally magnetizes the lug 404 (and the valve operator 400) of the valve 304. For instance, the lug 404 is ferromagnetic, and a magnetic pole is established that attracts (e.g., draws, pulls, pushes, drives, or the like) the valve operator 400 toward the lug 404. Accordingly, the valve 304 optionally includes a solenoid 421, and the solenoid 421 includes (but is not limited to) the valve operator 400, the lug 404, and the coil 420.

The valve 304 optionally includes a magnetic flux frame 422 surrounding one or more of the lug 404 or the valve operator 400. The magnetic flux frame 422 encapsulates the magnetic field between the lug 404 and valve operator 400 and accordingly concentrates the magnetic field. For instance, the magnetic flux frame 422 enhances bounding of flux generated by the coil 420 to concentrate the magnetic field between the lug 404 and the valve operator 400.

Referring again to FIG. 4, as the amount of current flowing through the coil 420 increases, the magnetic field generated by the coil 420 increases as does the resulting force applied to the valve operator 400. For instance, an attractive force increases between the valve operator 400 and the lug 404. As the attractive force generated (e.g., induced, developed, provided, or the like) by the magnetized lug 404 overcomes forces such as fluid pressure within the housing 406, bias from the biasing element 418 or the like—the valve operator 400 begins moving from the closed position (FIG. 5) to the open position (FIG. 4). As described herein, the movement of the valve operator 400 is affected by one or more characteristics including the previously described fluid pressure, bias, or the like, and these characteristics alter the movement and accordingly vary an actual duty cycle of the valve 304 in comparison to a specified (e.g., desired) duty cycle.

A generated counter current (e.g., back electromotive force or back EMF) and corresponding magnetic field are examples of characteristics that alter the performance of the valve 304 relative to a specified duty cycle. For example, as the valve operator 400 moves toward the open position a counter current is generated in the coil 420 as the flux linkage changes because of a change of magnetically permeable material within the magnetic field (e.g., more of the valve operator having a higher magnetic permeability moves into the magnetic field and displaces fluid having a lower permeability). As the valve opens the flux linkage of the valve 304 changes due to the valve operator 400 occupying the previously fluid filled fluid gap 500. Conversely, when the valve operator 400 is in the closed position (FIG. 4) the fluid gap 500 is filled with the fluid having a lower magnetic permeability and the flux linkage again changes and generates counter current. The changes in flux linkage generate correspond counter currents (e.g., back EMF) that resist otherwise specified operation of the valve including opening and closing movements and thereby slow opening and slow closing as flux linkage changes and back EMF is generated.

The direction of the current generated in the coil 420 and its magnetic field caused by the moving valve operator 400 opposes the initial magnetic field of the coil 420 (e.g., the magnetic field generated by a current flowing through the coil 420). In an example, opposition of the initial magnetic field decreases the initial magnetic field generated by the coil 420 (e.g., according to Lenz's Law, or the like). Thus, in some examples, as the valve operator 400 moves nearer the coil 420 (or within the housing 406), the magnitude of current in the coil is reduced to oppose the originally created field caused by the current applied to the coil 420 (e.g., a ramping current, or the like).

Figure 6:
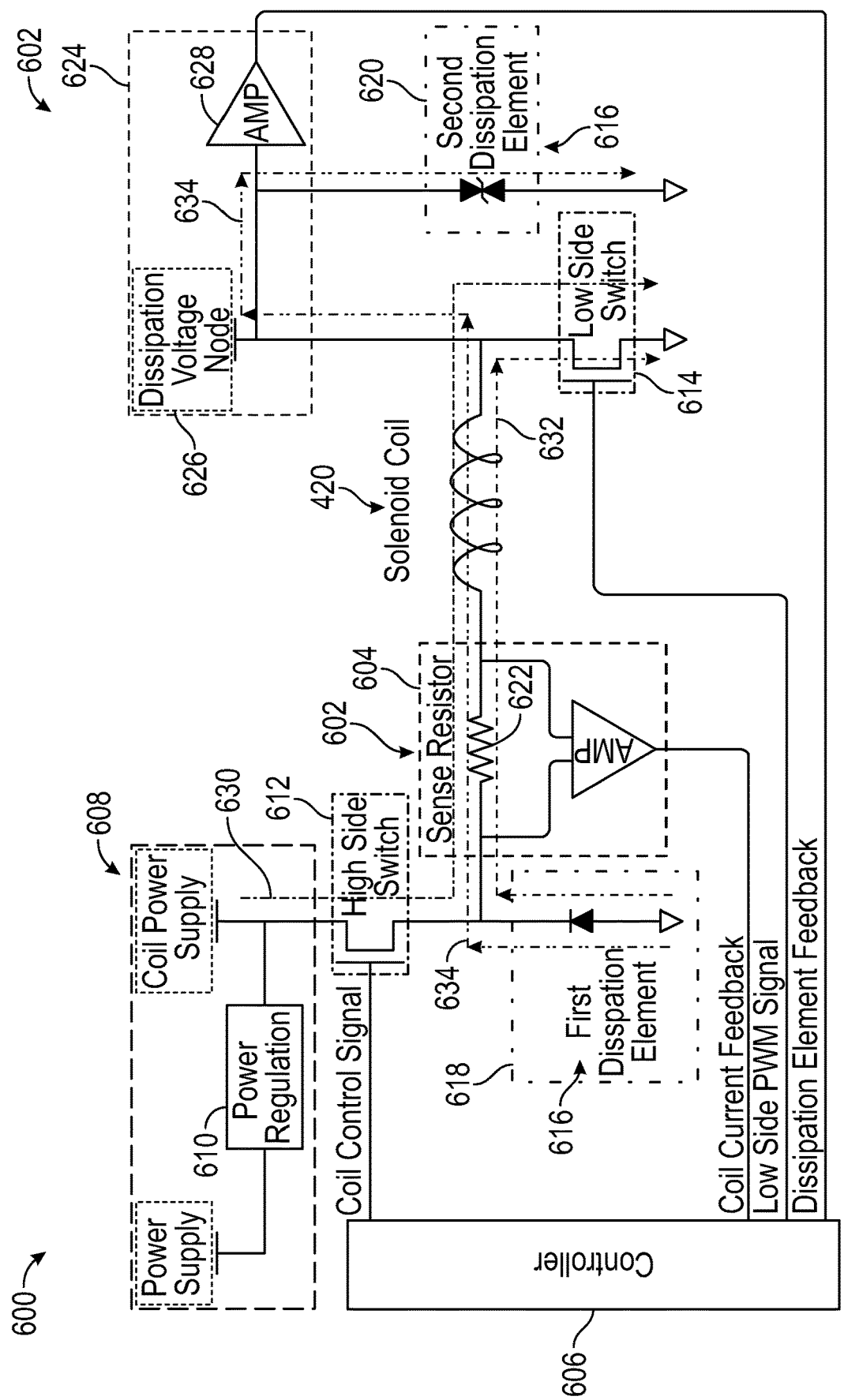
FIG. 6 illustrates an example of a system for applying an agricultural fluid including a controller, according to an embodiment of the present subject matter.

FIG. 6 illustrates a schematic diagram of a nozzle control system 600. The agricultural sprayer 100 (shown in FIG. 1) includes the nozzle control system 600. For instance, the nozzle control system 600 is used in combination with one or more components (or functions) of the nozzle control system 200 (shown in FIG. 2) or the nozzle control system 300 (shown in FIG. 3). In an example, the nozzle control system 600 includes the plurality of nozzles 106 (shown in FIG. 1) and one or more associated valves 304 (e.g., a PWM solenoid valve, or the like). The valves 304 (shown in FIG. 3) regulate flow to provide a specified target application rate of an agricultural product from the agricultural sprayer 100.

The nozzle control system 600 includes one or more sensors 602 that facilitate monitoring of one or more electrical characteristics (e.g., current, voltage, resistance, or the like) of components of the system 600. For example, the nozzle control system 600 includes a coil characteristic sensor 604, for instance included in series with the coil 420. In an example, the coil characteristic sensor 604 determines (e.g., measures, monitors, obtains, provides, evaluates, observes, or the like) the magnitude of current through the coil 420 (or voltage across the coil 420).

In an example, the system 600 includes a nozzle controller 606, and the nozzle controller 606 monitors the electrical characteristics of the system 600. For instance, the controller 606 is in communication with the sensors 602, and the controller 606 monitors the sensors 602. For example, the controller 606 monitors the magnitude of the current through the coil 420 (e.g., as determined by the characteristic sensor 604). In some examples, the controller 606 performs one or more mathematical operations upon the monitored electrical characteristics. For instance, the controller 606 monitors one or more rates of change of the current through the coil 420.

As discussed herein, movement of the valve operator 400 facilitates flow through the valve 304. In an example, movement of the valve operator 400 (e.g., with respect to the housing 406, shown in FIG. 3) generates a change in current through the coil 420. In some examples, the controller 606 monitors the change in current through the coil 420 by way of the sensor 604. Accordingly, in this example the controller 606 determines when the valve operator 400 actually moves (in contrast to when it should move based on a specified duty cycle) based on the monitoring of electrical characteristics with the sensor 604 (e.g., a decrease in current indicates movement of the valve operator 400). Thus, the control system 600 (e.g., the controller 606 and sensor 604) detects actual movement of the valve operator 400 including one or more of initial (e.g., beginning, starting, or the like) movement of the operator, full transition of the valve operator 400 (e.g., to open or closed positions) and movement therebetween.

The valve 304 is optionally closed (e.g., to inhibit flow in the channel 412 between the valve inlet 414 and the valve outlet 416) by dissipating the magnetic field between the lug 404 and the valve operator 400. For example, the magnetic field between the lug 404 and the valve operator 400 is dissipated and the biasing element 418 is thereby freed to overcome the attraction force between the valve operator 400 and the lug 404. The valve operator 400 is biased with the biasing element 418 toward the closed position. In an example, the current flowing through the coil 420 is reduced to dissipate the magnetic field generated by the coil 420. For example, the voltage potential applied to the coil 420 is removed from the coil 420. When the voltage potential is removed, the current flowing through the coil 420 will decrease and the magnetic field generated by the coil 420 will also begin to dissipate (e.g., decay, reduce, decrease, diminish or the like). When the magnetic field has sufficiently dissipated, the biasing element 418 will bias the valve operator 400 back towards the valve seat 409 and the closed position.

As the valve operator 400 begins to transition from the open position (shown in FIG. 4) toward the closed position (shown in FIG. 5), the amount of flux linkage in the magnetic circuit (e.g., between the lug 404 and the valve operator 400) decreases. For instance, fluid having a lower magnetic permeability fills the fluid gap 500 as the valve operator 400 (with a relatively higher magnetic permeability) moves out of the gap and toward the closed position. A counter current is generated in the coil 420 as the valve operator 400 begins to move, and the counter current opposes the change in flux linkage (e.g., according to Lenz's law, or the like). The direction of the current generated in the coil 420 by the transitioning valve operator 400 is such that the generated current generates a counter magnetic field opposed to the dissipating magnetic field in the coil 420. In an example, the generated current is monitored (e.g., by the controller 606 in communication with the one or more sensors 602) to determine when the valve operator 400 is transitioning from the open position to the closed position.

In an example, the valve control system 600 includes a power conditioning system 608. The power conditioning system 608 provides a drive voltage potential to operate the system 600 (including the valve 304 having the coil 420). In some examples, the coil 420 acts like an inductor, and the current flowing through the coil 420 does not change instantaneously. The rate of adding energy into the coil 420 is optionally increased, for example by increasing the drive voltage potential (e.g., a voltage applied across the coil 420 with the power conditioning system 608) to overcome the inductance of the coil 420.

In some examples, the open time for the valve 304 is improved by reducing the force of the biasing element 418 to make the biasing force easier to overcome. Increasing the rate that energy is dissipated from the coil 420 (and corresponding dissipation of the magnetic field) optionally reduces the close time of the valve 304 (e.g., a time duration for the valve operator 400 to transition from the open position to the closed position). Further, reducing the amount of energy to be dissipated from the valve 304 (e, g., the coil 420) optionally reduces the close time of the valve 304. An increase in the spring constant of the biasing element 418 aids in returning the valve operator 400 to the closed position (e.g., with the seal 408 engaged with the valve seat 409) though it may conversely increase the duration of valve open as the stiffer biasing element 418 opposes opening.

In some examples, the coil 420 has a defined resistance, and when a potential is applied across the coil 420, a first amount of energy will be dissipated by the coil 420 to build the magnetic field. A second amount of energy is dissipated due to the resistance of the coil 420 (e.g., as heat). Once the valve 304 transitions from the closed position to the open position, the amount of magnetic field needed to maintain the open position of the valve operator 400 is reduced because the initial additional force to separate the seal 408 from the seat 409 against the fluid pressure of the valve 304 is reduced (e.g., in comparison to when the valve operator is in the closed position). With the valve operator 400 in the open position, the fluid gap 500 (shown in FIG. 5) between the lug 404 and the valve operator 400 is removed (shown in FIG. 4). Since the field is optionally reduced, the amount of current running through the valve 304 is optionally reduced to maintain the valve 304 (e.g., the valve operator 400) in the open position, for example to save power (e.g., hitting and holding the valve operator 400 in the open position). In an example, a full voltage potential is applied to the coil 420 until the valve operator 400 transitions to the open position from the closed position. Once the valve 304 has opened, a reduced voltage potential (or current), or a modulated current (shown in FIG. 7 as the rapid saw tooth portion of the current plot), is applied to the coil 420 to facilitate maintaining the valve operator 400 in the open position while reducing the power consumption due to the wiring resistance in the coil 420.

In an example, the system 600 includes a coil drive voltage regulator 610, for instance to facilitate operating the power conditioning system 608 at a fixed, or nearly fixed voltage. The controller 606 optionally modulates one or more of a high side switch 612 and a low side switch 614, for instance to provide energy to the coil 420. The high side switch 612 and the low side switch 614 are optionally located on either side of the coil 420. For example, the high side switch 612 is included in the system 600 on a first side of the coil 420. In an example, the low side switch 614 is included in the system 600 on a second side of the coil 420. In an example, current flows through the coil 420 (and energizes the coil 420) when the switches 612, 614 are closed. In some examples, one or more of the switches 612, 614 are normally open, and modulation of the switch closes a circuit and allows current to flow through the switches 612, 614. For instance, the switches 612, 614 are normally open to facilitate conservation of power in the system 600 (e.g., by selectively supplying power to the system 600 as needed).

In some examples, the system 600 includes one or more dissipation elements 616, for instance a first dissipation element 618 and a second dissipation element 620. The dissipation elements 616 include (but are not limited to) a flyback diode, freewheeling diode, clamp diode, transient voltage suppression diode, resistor, capacitor, or the like. In an example, the first dissipation element 618 includes a freewheeling diode, and the dissipation element 618 facilitates recirculation of current through the coil 420 to facilitate the maintenance of the magnetic field with less energy. The dissipation element 616 optionally have a dissipation characteristic and dissipate energy within the system 600, for instance from the coil 420. In some examples, the dissipation element 616 helps recirculate energy within the system 600 (e.g., by recirculating current through the freewheel path 632, or the like). For example, the dissipation element 618 facilitates recirculation of current through the coil 420 (with corresponding maintenance of the magnetic field) when the high side switch 612 is open (e.g., to inhibit current flow through the switch 612) and the low side switch 614 is closed (e.g., to allow recirculating current to flow between the switch 614 and the dissipation element 616 with the intervening circuit having the coil 420 and ground).

The second dissipation element 620, for example, facilitates deenergizing of the coil 420. For instance, the dissipation element 620 includes a clamping diode, and the dissipation element 620 quickly dissipates recirculating energy in the system 600 (e.g., removes, reduces, diminishes, dumps, minimizes or the like) from the coil 420 (or the system 600) when both switches 612, 614 are opened. Accordingly, current flowing through the coil 420 is forced to divert to a flyback path (e.g., the flyback path 634, or the like) for dissipation across the dissipation element 620 (e.g., a clamping diode).

As described herein, the controller 606 monitors the sensors 602. For instance, the controller 606 determines when the valve operator 400 moves based on the monitoring of electrical characteristics with the sensor 604 (e.g., a decrease in current corresponding to movement of the valve operator 400 with respect to the housing 406). The system 600 optionally includes a sense resistor 622. For instance, the sense resistor 622 facilitates monitoring of electrical characteristics of the system 600 (e.g., current through the coil 420), for example with the controller 606.

In an example, the controller 606 monitors the sensors 602 to correspondingly monitor the mechanical response of the valve operator 400 (e.g., movement of the valve operator 400 between the closed position and the open position). Monitoring of the mechanical response of the valve operator 400 facilitates determining the actual duty cycle of the valve 304.

In some examples, the coil characteristic sensor 604 includes the sense resistor 622. For example, the sense resistor 622 facilitates determining electrical characteristics of the coil 420. Monitoring of the electrical characteristics of the coil 420 facilitates monitoring of movement of the valve operator 400, for instance to determine when the valve operator 400 begins to transition from the closed position to the open position. In an example, the sense resistor 622 (in cooperation with the controller 606) facilitates determining when the valve operator 400 has fully transitioned to the open position (from the closed position). In some examples, the sense resistor 622 is located in series with the coil 420. In an example, the sense resistor 622 is located in the system 600 between the coil 420 and the switch 612. The sense resistor 622 is optionally located in series with the power conditioning system 608 and the coil 420. Thus, the coil characteristic sensor 604 determines electrical characteristics of the coil 420 and facilitates monitoring of the electrical characteristic of the coil 420 with the controller 606. Accordingly, monitoring of the electrical characteristics of the coil 420 facilitates determining when the valve operator 400 actually moves (e.g., because the mechanical response of the valve 304 differs from the electrical signals operating the valve 304).

In an example, the sensors 602 include a dissipation characteristic sensor 624. For instance, the dissipation characteristic sensor 624 determines one or more electrical characteristics of the dissipation elements 616. For example, the dissipation characteristic sensor 624 determines a voltage across the second dissipation element 620, for instance by determining a voltage at a dissipation voltage node 626 between the coil 420 and the second dissipation element 620.

In an example, the dissipation characteristic sensor 624 facilitates monitoring of movement of the valve operator 400. For instance, the controller 606 optionally monitors the dissipation characteristic sensor 624 to monitor the mechanical response of the valve operator 400 (e.g., movement of the valve operator 400 between the open position and the closed position). The controller 606 monitors the sensor 624 to determine when the valve operator 400 begins to transition from the open position to the closed position. In another example, the sense resistor 622 (in cooperation with the controller 606) facilitates determining when the valve operator 400 has fully transitioned to the closed position (from the open position).

The system 600 optionally includes one or more signal processors 628. For instance, the signal processors 628 provide signal conditioning, amplification, or the like for components of the system 600. In an example, the signal processors 628 facilitate monitoring of electrical characteristics by the controller 606. For example, the signal processors 628 condition electrical characteristics of the system 600 for monitoring by the controller 606. For instance, the signal processors 628 allow the controller 606 to monitor the voltage at the dissipation voltage node 626. The signal processors 628 allow the controller 606 to monitor current flowing through the coil 420, for example by monitoring the voltage across the sense resistor 622.

Figure 7:
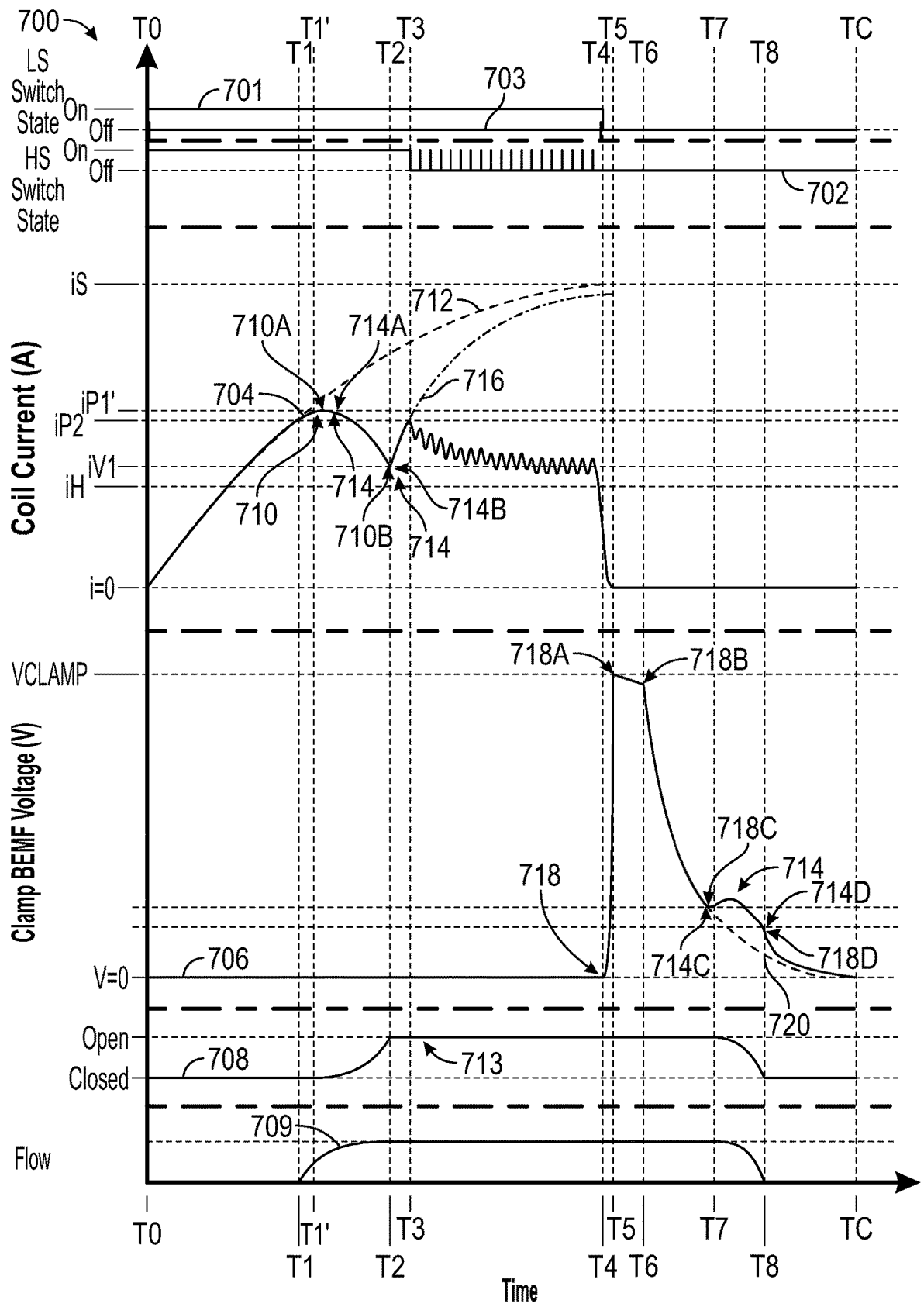
FIG. 7 illustrates a representation of one or more drive signals used to apply a specified duty cycle to a valve and the resultant waveform shapes that are monitored by the controller, according to an embodiment of the present subject matter.

FIG. 7 illustrates a representation of one or more drive signals used to apply a specified duty cycle to a valve (e.g., the valve 304, shown in FIG. 3) and the resultant waveforms (e.g., one or more electrical characteristics, valve operator positions, specified and actual duty cycles, or the like) that are monitored (or determined) by the controller 606 in combination with the sensors described herein. FIG. 7 shows one iteration (sequence) of an example specified duty cycle, the resulting actual duty cycle and the monitored or sensed characteristics described herein.

FIG. 6 shows arrows indicating flow of current through the system 600 in the various configurations described herein (e.g., during energizing of the coil 420, maintenance of the energized coil, and dissipation of energy from the coil 420). The system 600 shown in FIG. 6 includes an energizing path 630 (dot-dash stippled lines) that energies the coil 420 to generate the magnetic field (e.g., to open the valve). In an example, current flows through the energizing path 630 when the high side switch 612 and the low side switch 614 are closed. In another example, the system 600 includes the freewheel path 632 (dot-dash-dash stippled lines) that allows current to recirculate through the coil 420 (e.g., to maintain the magnetic field and hold the valve operator 400 in the open position). For instance, current flows in the freewheel path 632 including ground and the coil 420 when the high side switch 612 is open and the low side switch 614 is closed. In yet another example, the system 600 includes a flyback path 634 (dot-dot-dash stippled lines) that dissipates energy from the coil 420. In an example, current flows through the flyback path 634 when the high side switch 612 and the low side switch 614 are open. Accordingly, the system 600 operates the switches 612, 614 to direct current flow through one or more of the energizing path 630, the freewheel path 632, or the flyback path 634 to accomplish energizing of the coil 420 and generation of the magnetic field, maintenance of the magnetic field or dissipation of energy (and the magnetic field), respectively.

FIG. 7 shows time intervals T0, T1, T1', T2, T3, T4, T5, T6, T7, T8, and TC along a common X-axis for each of differing plots that follow characteristics of the nozzle control system 600 during operation. The Y axes of the respective plots are graduated by corresponding characteristics including, but not limited to, voltage, current, open or closed states (and intermediate positions) or the like. In an example, the high side switch 612 and the low side switch 614 (shown in the upper most plots of FIG. 6) are modulated between on off states. The first (upper most) plot of FIG. 7 shows a low side switch state 700 and the second plot shows a high side switch state 702. For instance, the high side switch state 702 is in the on state at T0, and the low side switch state 700 is in the off state at T4. In some examples, a specified duty cycle 701 of the valve corresponds to the low side switch state 700 having a corresponding specified time length 703, in this example of T0 to T4 of one full cycle (e.g., for a complete cycle including on and off of time T0 to TC). In other examples, the specified duty cycle 701 is represented as a percentage (e.g., 30, 40, 50, 60 percent or so on) of one full cycle (time T0 to TC).

The controller 606 (in cooperation with the sensor 604, shown in FIG. 6) monitors a coil electrical characteristic 704 (e.g., current) of the coil 420 as shown in the third plot of FIG. 7. In another example, the controller 606 (in cooperation with the sensor 624, shown in FIG. 6) monitors a dissipation element electrical characteristic 706 (e.g., one or more of voltage, current, or the like) of the dissipation element 620 shown in the fourth plot of FIG. 7. Additionally, FIG. 7 shows a fifth plot of a valve operator position 708 indicating the position of the valve operator 400 within the valve 304 with the bottom of the curve corresponding to the closed position and the peak of the curve corresponding to the open position. In an example, the actual duty cycle of the valve corresponds to the valve operator position 708.

Further, flow 709 agricultural product or the like through the valve of the valve system 600 is shown in the sixth plot (lower most) in FIG. 7 and varies between a value of 0 (e.g., no flow) and 1 (e.g., 100 percent flow indicating the valve is open and steady state flow is provided). As discussed herein, movement of the valve operator 400 permits (or inhibits) flow 709 through the valve.

As shown in FIG. 7 with the specified duty cycle 701 corresponding to the low side switch state 700 and the actual duty cycle 713 corresponding to the valve operator position 708 the valve operator movement (opening and closing) lags in comparison to the specified duty cycle 701. For instance, the actual duty cycle 713 is clearly positioned behind (time-wise) the specified duty cycle 701. This variation or lag between the actual and specified duty cycles 713, 701 causes errant application of agricultural product (e.g., quantity of product applied, location of application, or the like) relative to the specified duty cycle 701.

In one example, at time T0, the valve operator 400 is a closed position as shown with the valve operator position plot 708. At time T0 both of the high side switch 612 and low side switch 614 (shown in FIG. 6) are closed, a circuit is completed, and current begins to flow through the current sense resistor 622 and the coil 420 (shown in FIG. 6). The coil 420 initially behaves as an inductor (resisting the increased current), and the coil electrical characteristic 704 (e.g., current) does not change instantaneously, but instead increases over time from T0 onward. For example, the coil electrical characteristic 704 increases with time as shown in FIG. 7 after closure of the low side switch state 700 at T0. The resulting magnetic field generated from the coil 420 builds as current increases. The building magnetic field applies a corresponding increasing force to the moveable valve operator 400. As the magnetic field builds in the coil 420 and the lug 404 the force produced by the field overcomes the combination of forces holding the valve operator 400 in the closed position (e.g., pressure holding the valve 304 closed, the bias force holding the valve closed, and any other forces on the valve operator 400 holding it closed position such as gravity) and the operator 400 begins moving toward the open position.

The plotted coil electrical characteristic 704 shows a plurality of inflection points 710. As previously described, as the valve operator 400 begins to move (e.g., from closed to open) at approximately T1 a counter current is generated, and the counter current is graphically shown in FIG. 7 with a first inflection point 710A at T1 along the coil characteristic 704 plot. In contrast, if there was no moveable valve operator 400, the current would follow the upward trending path indicated by the first dashed line 712. In some examples, monitoring of this electrical characteristic is utilized to diagnose a service issue with the valve 304, such as the absence of a valve operator 400 (e.g., after servicing). If the valve operator 400 is missing from the valve 304 (e.g., errantly not replace after service) the electrical characteristic 704 will behave in a manner consistent with first dashed line 712 and thereby facilitate diagnosis of a missing operator 400.

The fifth plot of FIG. 7 shows the valve operator position 708, and the valve operator position 708 corresponds to a position of the valve operator 400 within the valve 304 with the bottom of the curve corresponding to the closed position and the peak of the curve corresponding to the open position. In an example, FIG. 7 shows the valve operator 400 beginning to translate at time T1 (e.g., a translation start time, corresponding to when the measured current signature starts to depart from the dashed line 712). In an example, Faraday's law indicates that movement of the valve operator 400 generates a field in the coil 420. Lenz's law indicates that the current generated by the valve operator 400 must oppose the direction of the building magnetic field caused by the driver of the coil 420 (e.g., the characteristic 704, current, provided with the power conditioning system 608, or the like). Accordingly, in an example, a change (e.g., decrease with respect to time) in the coil electrical characteristic 704 (the third plot), current, indicates one or more valve operator translation signatures 714, specifically indicating when the valve operator 400 begins opening movement (from closed) toward the lug 404 of the valve 304.

In some examples, the controller 606 (shown in FIG. 6) compares the monitored electrical characteristics of the system 600 to the one or more valve operator translation signatures 714 (shown in the third plot and the fourth plot of FIG. 7). For instance, a first valve operator translation signature 714A corresponds to at least one inflection point 710 of the coil electric characteristic 704 for example at T1'. In an example, the inflection points 710 include one or more of a change in magnitude of a derivative of the characteristic 704, such as an increase in the rate that the slope is decreasing; a change in sign of the slope of the characteristic 704; a change in sign of the derivative of characteristic 704; peaks and valleys; or the like. The controller 606 monitors the coil electric characteristic 704 (the third plot) and indexes at least a component of movement of the valve operator 400 (shown in the fifth plot) based on features of one or more of the coil electrical characteristic 704 or the dissipation element characteristic 706 (the fourth plot). The controller 606 compares the indexed the electrical characteristics to the valve operator translation signature 714, for example by locating one or more of the inflection points in one or more of the coil electric characteristic 704 or the dissipation element characteristic 706.

Referring to FIG. 7, as the valve operator 400 moves (indicated with the valve operator position 708), the inductance of the coil 420 begins to change as more of the volume inside the solenoid 421 is converted from fluid with a low magnetic permeability to include the valve operator 400 material with a relatively higher magnetic permeability. When the valve operator 400 reaches the top of the valve 304 (fully open, shown in FIG. 4) and shown at T2 in the fifth plot of FIG. 7 the valve operator 400 stops moving and no longer generates a counter current in the coil 420. As shown with the coil electric characteristic 704 (third plot), the current ceases decreasing at a second inflection point 710B and begins to rise again. The current in the coil 420 continues to build as it did before due to the potential through the coil 420 (applied by the power conditioning system 608) without the counter current provided by the previously moving valve operator 400. Accordingly, the second inflection point 710B corresponds to a second valve operator translation signature 714B indicating the valve operator 400 is fully open. Thus, the controller 606 monitors the coil electric characteristic 704 and determines that the valve operator 400 has fully moved to the open position based on the valve operator translation signature 714B at time T2.

At time T2, the valve operator 400 is at the open position, and at time T3 the controller 606 optionally reduces the current and associated magnetic field in the solenoid 421 for instance to save energy. For instance, the controller 606 maintains the current at a lower level recognized to retain (e.g., maintain) the valve operator 400 in the open position. In an example, the current is modulated as shown with the sawtooth wave at T3 (e.g., with selective opening and closing of the high side switch 612 while the low side switch 614 is closed). For example, the electrical resistance in the coil 420 and loss in one or more of the dissipation elements 616 and switches 612, 614 causes the coil electrical characteristic 704 to decay. In order to maintain the field generated by the coil 420, the high side switch 612 is modulated to add energy to the solenoid 421 (e.g., the coil 420, or the like) as needed to maintain the valve operator 400 open while minimizing power usage.

The modulated current maintains the magnetic field in the solenoid 421 with a slight imbalance (e.g., relative to gravity, fluid pressure, bias from the bias element or the like) to ensure retention of the valve operator 400 in the open position. In an approach, the inductance of the coil 420 is higher and the coil electrical characteristic 704 would follow the path indicated by a second dotted line 716 in the coil electrical characteristic 704 until it had saturated near a maximum value (e.g., approaches a limit, or the like) if the high side switch 612 was maintained in the on state.

Modulating (e.g., selectively opening and closing) the high side switch 612 circulates current in the system 600 at a level to generate a magnetic flux between the lug 404 and the valve operator 400 so as to maintain the position of the valve operator 400 (e.g., in the open position). Accordingly, the system 600 modulates the switch 612 to provide a force imbalance incident upon the valve operator 400 and ensure retention of the valve operator 400 in the open position while reducing the power needed to maintain the position of the valve operator 400.

In some examples, the high side switch 612 is modulated between the on state and the off state (e.g., by selectively closing and opening the switch 612) while maintaining the low side switch 614 in the on (e.g., closed) state. Modulating the high side switch 612 while the low side switch 614 is in the on state causes current to flow through the freewheel path 632 that, in some examples, includes the low side switch 614, the first dissipation element 618, the sense resistor 622, and the coil 420 (shown in FIG. 6). Accordingly, modulating the high side switch 614 reduces the power usage for the system 600 to maintain the position of the valve operator 400 (e.g., in the open position). Thus, the performance of the system 600 is enhanced because of the reduced power consumption to maintain the position of the valve operator 400. In some examples, modulating the high side switch 612 between closed and open (with the low side switch 614 closed) ensures retention of the valve operator 400 in the open position is referred to as a hit-and-hold algorithm.

In an example, during a rising edge of the low side switch control, a hit state is initiated in the high side switch 612 and the controller 606 starts recording electrical characteristics, for example by monitoring the current flowing through the coil 420. The controller 606 analyzes the current data collected to determine if the valve operator 400 has translated between the open position and the closed position. In some examples, the controller 606 waits for a specified delay and repeats the analysis if a translation is not detected.

In an example, when the controller 606 determines the valve operator 400 has translated, the controller 606 optionally stops monitoring the electrical characteristics of the coil 420 and maintains the position of the valve operator 400 (e.g., by modulating the switch 612, or the like). Optionally, the controller 606 waits for a specified duration for a compare event in the low side switch 614 timer. When a compare event occurs, the low side switch 614 and the high side switches 612 are turned to an off state. Accordingly, current is forced to recirculate in the flyback path 634 to be dissipated across the second dissipation element 620 (e.g., a clamping diode, or the like). At this point, the controller 606 monitors the dissipation characteristic 706 (e.g., a flyback voltage, or the like). At the end of a wait period (e.g., either 1.0 ms or the until the next update event), the controller 606 analyzes the dissipation characteristic for transition signature 714.

The valve operator 400 is optionally moved to the closed position, for instance at time T4. In an example, both the high side switch 612 and the low side switch 614 are transitioned to the off state (e.g., to inhibit current flow through the switches 612, 614). With the switches 612, 614 in the off state, current is inhibited from flowing through the freewheel path 632. Accordingly, the current recirculating in the coil 420 flows through the flyback path 634 (see FIG. 6), optionally including the dissipation element 620 (e.g., a clamping diode), and begins to dissipate to free the valve operator 400 to move to the closed position.

FIG. 7 shows the monitored dissipation element electrical characteristic 706 (e.g., one or more of voltage, current, or the like) of the dissipation element 620 in the fourth plot. In an example, the dissipation element electrical characteristic 706 ("dissipation characteristic 706") includes a monitored voltage at the dissipation voltage node 626 (shown in FIG. 6). Since the dissipation characteristic 706 is greater than the voltage potential across the coil 420 with the switches 612, 614 in the off state, the energy of the magnetic field is quickly collapsed into a high electrical potential at the dissipation voltage node 626. Conversely, as the voltage across the coil 420 rapidly rises the coil characteristic 704 (e.g., current) shown in the fourth plot flowing through the coil 420 quickly collapses to 0, for instance as shown by time T5 proximate to time T4. As previously discussed, current generates the magnetic field that retains the valve operator 400 in the open position, and the rapid decrease of current (and corresponding magnetic field) accordingly permits the movement of the operator toward the closed position.

In between T5 and T6, the dissipation characteristic (voltage) 706 is saturated, current decreases as shown in the third plot, and the magnetic field generated by the coil 420 decreases quickly. As the field decreases, the corresponding force retaining the open position of valve operator 400 against the fixed lug 404 dissipates—and the force provided by the biasing element 418 (shown in FIG. 4) overcomes the retaining force and closing movement of the valve operator 400 is initiated. In some examples, the dissipation characteristic 706 includes one or more voltage inflection points 718. For instance, a first voltage inflection point 718A (shown at T5) correlates to the time when the current is directed to the second dissipation element 620 (and the voltage at the node 626 rises). In an example, a second voltage inflection point 718B (shown at T6) corresponds to when the dissipation element 620 is no longer saturated. FIG. 7 shows the valve operator position 708 (fifth plot) begins movement from the open position to the closed position at approximately T7 (e.g., a translation start time) corresponding to a third voltage inflection point 718C. Closing movement finishes at approximately T8 (e.g., a translation stop time) corresponding to a fourth voltage inflection point 718D. In an example, as the valve operator 400 moves away from the collapsing magnetic field, the valve operator 400 induces a current in the coil 420, and accordingly provides a corresponding change in the otherwise dissipating voltage of characteristic 706 having a third valve operator translation signature 714C. For example, the valve operator translation signature 714C includes a change (e.g., an increase with respect to time, or the like) in the dissipation element electrical characteristic 706, voltage in the example shown. In an example, the third voltage inflection point 718C corresponds to movement of the valve operator 400 (e.g., translation signature 714C). Completion of movement corresponds to, for instance, the fourth inflection point 718D and a fourth translation signature 714D when the valve operator 400 comes to a rest (and the valve 304 is closed).

In one example, Lenz's law indicates that the current generated by the valve operator 400 transitioning to the closed position opposes the change in the characteristic 706 as a result of the collapsing magnetic field. Thus, in an example, instead of seeing the voltage decay of the coil 420 (e.g., an inductor, or the like) that is discharging (represented by a third dotted line 720), the dissipation characteristic 706 will rise and then fall relative to the previous decay until the valve operator 400 has completed its movement (e.g., translation, transition, stroke, displacement, change, shift, or the like) from the open position (e.g., at T7) to the closed position (e.g., at T8). In an example where the field generated by the solenoid 421 is insufficient to maintain the valve operator 400 in the open position, the valve operator 400 will transition to the closed position prior to turning off the switches 612, 614. At time T8, the valve operator 400 has fully completed movement to the closed position, and any remainder of the field generated by the coil 420 decays based on the lower inductance in the coil 420 since the fluid gap 500 has been reintroduced. In some examples, the valve 304 remains in this de-energized state until time TC which is the duration of a cycle.

Accordingly, the time duration between T1 (e.g., when the valve operator 400 begins moving toward the open position) and T8 (e.g., when the valve operator 400 moves to the closed position and the flow 709 through the valve 304 stops) corresponds to an actual duty cycle 713 of the valve 304. For example, the actual duty cycle 713 of the valve 304 corresponds to the time between actual opening of the valve operator 400 with beginning of translation to the open position at T1 (in contrast to the preceding operation of the switches 612, 614 at T0) and a translation stop time of the valve operator 400 at T8 (when the valve operator 400 is in the closed position). As shown in FIG. 7, the actual duty cycle 713 is different than the specified duty cycle 701 corresponding to the low side switch state 700. For instance, the actual duty cycle 713 lags behind the specified duty cycle 701 and its timing and corresponding characteristics such as length of time open or closed, initiation of movement, corresponding flow or the like varies relative to the specified duty cycle 701.

As discussed herein, the system 600 guides the actual duty cycle 713 of the valve 304 to comport with the specified duty cycle 701. For example, the specified duty cycle 701 corresponds to the portion of the low side switch state 700 (e.g., from T0 to T4). The actual duty cycle 713 corresponds to the valve operator position 708 shown in the fifth plot of FIG. 7 and determined from the coil electrical characteristic 704 (e.g., current) in the third plot indicating the actual opening of the valve and the dissipation element electrical characteristic 706 (e.g., voltage) in the fourth plot indicating the actual closing of the valve. For instance, the actual duty cycle 713 corresponds to the valve operator 400 in the open position (e.g., from T1 to T8). The system 600 determines one or more errors (e.g., a difference, delta, or the like) between the specified duty cycle 701 and the actual duty cycle 713. In an example, a portion of the error in the actual duty cycle 713 relative to the specified duty cycle 701 is generated from differences in opening and closing movement of the valve operator 400 between the specified and actual cycles (e.g., lagging of opening and closing movement, variation in duty cycle length relative to the specified or the like).

The system 600 applies a correction, for example a magnetic flux correction, to the specified duty cycle 701 to guide the actual duty cycle 713 of the valve 304 toward the specified duty cycle. In an example, the correction applied to the specified duty cycle corresponds to the error determined between the actual duty cycle and the specified duty cycle. As one representative example, opening of the valve in the actual duty cycle 713 is delayed by 0.005 seconds (5 milliseconds or 5 ms) relative to the specified duty cycle 701. The system modulates the switches 612, 614 to advance the timing of the specified duty cycle by 5 ms to guide the actual duty cycle 713 of the valve 304 to the specified duty cycle 701 (e.g., with a modified specified duty cycle). Thus, the system 600 adjusts (e.g., corrects, modulates or the like) the magnetic flux generated by the coil 420 to achieve actual operation of the valve operator 400 (opening, closing, and timing of the same) according to the specified duty cycle. Accordingly, the system 600 minimizes error between the specified duty cycle 701 and the actual duty cycle 713 to improve the performance of the valve 304 (e.g., to open or close the valve operator 400 at a desired point in time, permit flow through the valve 304 for a specified period of time or the like).

Figure 8:
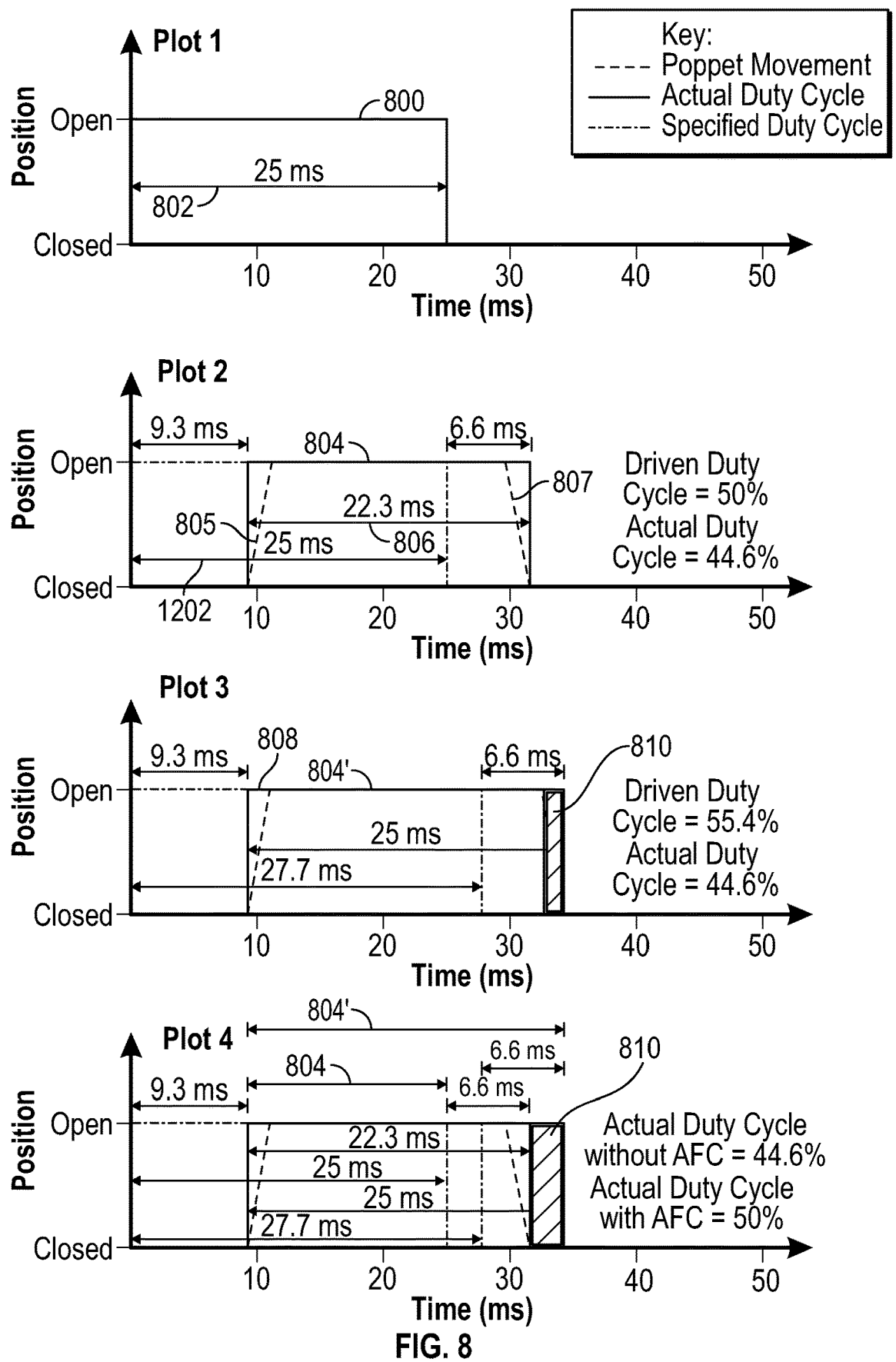
FIG. 8 illustrates an example diagram of duty cycle guidance.
Figure 11:
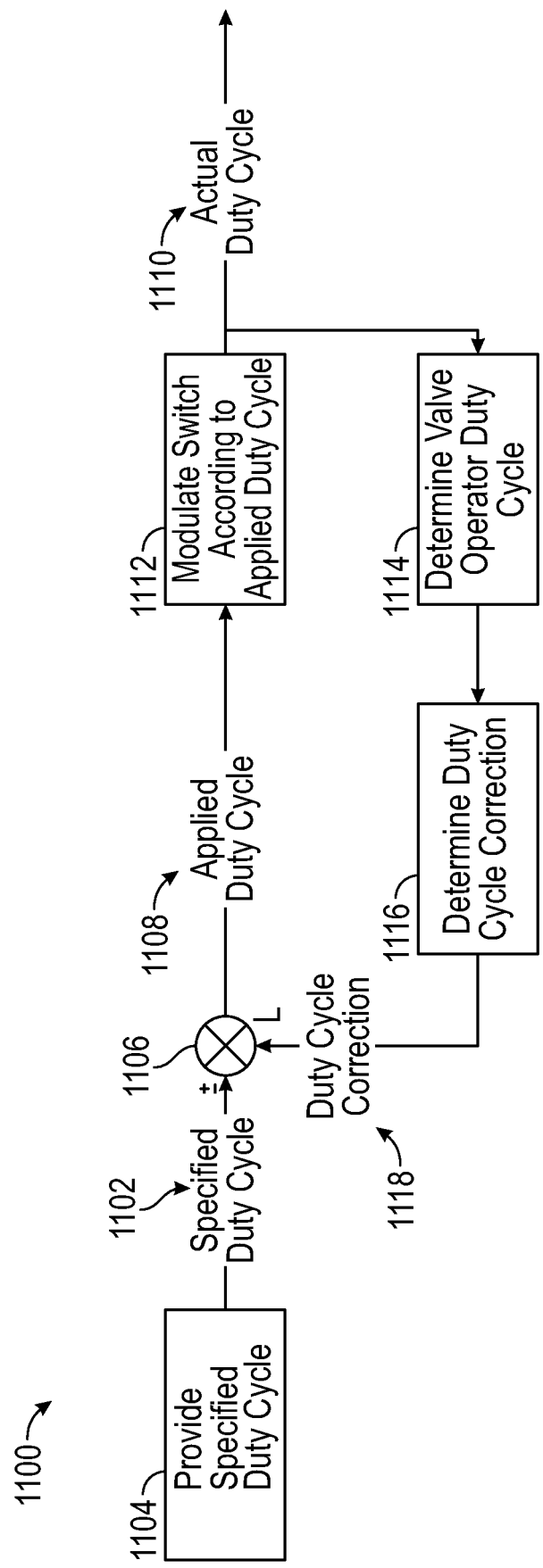
FIG. 11 illustrates an algorithm for compensating for variability using a moveable valve operator position or a magnetic flux correction, according to an embodiment of the present subject matter.

FIG. 8 illustrates a diagram of duty cycle guidance, for instance to minimize error between the specified duty cycle 701 and the actual duty cycle 713 shown in FIG. 7. In some examples, the duty cycle guidance discussed herein is referred to as an algorithm 801. The controller 606 generates a magnetic flux correction for an example specified duty cycle 800 (FIG. 8 with an associated specified on period 802), an actual duty cycle 804 (with an associated actual on period 806) shown in the second plot and an actual duty cycle 804' (e.g., an updated actual duty cycle 804 or valve performance) that is based on the specified duty cycle 800 and a magnetic flux correction (collectively an applied duty cycle 808) is shown in the third plot of FIG. 8. An example feedback control loop 1100 for generating the applied duty cycle 808 is shown in FIG. 11.

Referring first to FIG. 8, the specified duty cycle 800 in the first plot is shown with an associated specified on period 802 of 25 milliseconds ("ms") and conversely an off period of 25 ms for a total cycle time of 50 ms. The specified duty cycle 800 is specified in some examples as a percentage, and in this example corresponds to a 50 percent duty cycle; the on period 802 is 50 percent of the full cycle of 50 ms.

The actual duty cycle 804 (e.g., mechanical performance of the valve 304) is shown in the second plot of FIG. 8. As previously described, the movement of the valve operator 400 is detected, in one example as shown in FIG. 6, to determine the actual duty cycle 713 in FIG. 7 and the example actual duty cycle 804 in FIG. 8. In the example shown in FIG. 8, the actual duty cycle 804 extending between on and off transitions 805, 807 of the valve operator is 22.3 ms. The error between the length of the actual duty cycle 804 and the specified duty cycle 800 is 2.7 ms. In another example, the actual duty cycle 804 is a 44.6 percent duty cycle relative to the specified duty cycle of 50 percent shown in the upper plot of FIG. 8 (e.g., a negative 5.4 percent error).

The system 600 including for example the feedback control loop 1100 (of FIG. 11) uses this error (e.g., 2.7 ms or 5.4 percent) to determine and apply a magnetic flux correction 810 (referred to as the duty cycle correction in FIG. 11) that modifies the signal for the specified duty cycle 800 to the applied duty cycle 808 to guide the mechanical performance of the valve 304 toward the specified duty cycle 800 (see the third plot in FIG. 8) having performance (e.g., on time percentage, on duration or the like) corresponding to the original specified duty cycle 800. The fourth plot in FIG. 8 shows the third plot overlaid with the second plot, thereby showing differences between the third plot (e.g., the actual duty cycle 804') and the second plot (e.g., the actual duty cycle 804).

The magnetic flux correction 810 increases or decreases the flux in the valve 304 to accordingly trigger a change in one or more of valve opening or valve closing (e.g., opens, closes earlier, later, one earlier one later, combinations of the same or the like) relative to the previous actual duty cycle 804. The applied duty cycle 808 (based on the specified duty cycle 800 with the magnetic flux correction 810), when implemented with the system 600, provides the actual duty cycle 804' shown in the third plot having a duration, percentage or the like), in this example 25 ms, relative to the actual duty cycle 804 length of 22.3 ms. The time length of the actual duty cycle 804', 25 ms, corresponds to the specified time length of 25 ms of the specified duty cycle 800. The actual duty cycle 804' is the actual valve performance of the valve 304 driven with the specified duty cycle 800 and the magnetic flux correction 810, and the actual duty cycle 804' has a duration of 25 ms that matches the duration of the original specified duty cycle 800 shown in the upper plot of FIG. 8. In other examples, if the actual duty cycle 804 is longer than the specified duty cycle 800, the system 600 implements a magnetic flux correction 810 (e.g., a change in magnetic flux that shortens the on performance of the valve) as part of the applied duty cycle 808 to generate the actual duty cycle 804' that matches the shorter specified duty cycle 800.

FIG. 8 shows the fourth plot, which includes the second plot overlaid with the third plot. The monitoring of the actual performance of a valve and its associated valve operator to determine an actual duty cycle based on detected valve operator movement (e.g., opening and closing of the valve operator) differences between the actual duty cycle 804 and the specified duty cycle 800 are readily determined and corrected with system 600 described herein including implementation of the magnetic flux correction 810. The system 600 drives the valve with an applied duty cycle 808 (the specified duty cycle including the magnetic flux correction 810) that causes the valve to mechanically behave with an actual duty cycle 804' that matches the specified duty cycle 800. In other examples, the system 600 and the example feedback control loop 1100 operate in an ongoing manner and accordingly modulate the specified duty cycle 800 with the magnetic flux correction 810 (collectively the applied duty cycle 808) to vary operation of the valve 304. For instance, as an agricultural vehicle (e.g., a sprayer or the like) changes velocity, turns, increases or decreases flow rates in different zones of a field or the like, the system 600 continues to monitor actual valve performance (opening and closing of one or more valves) to determine an actual duty cycle, compare the actual duty cycle with a specified duty cycle, and adjust the performance of the valve with an applied duty cycle based on the specified duty cycle modified with the magnetic flux correction 810 to achieve actual performance (e.g., sprayer output, flow rate, a resulting actual duty cycle or the like corresponding to the actual duty cycle 804') that matches a specified duty cycle.

Figure 9:
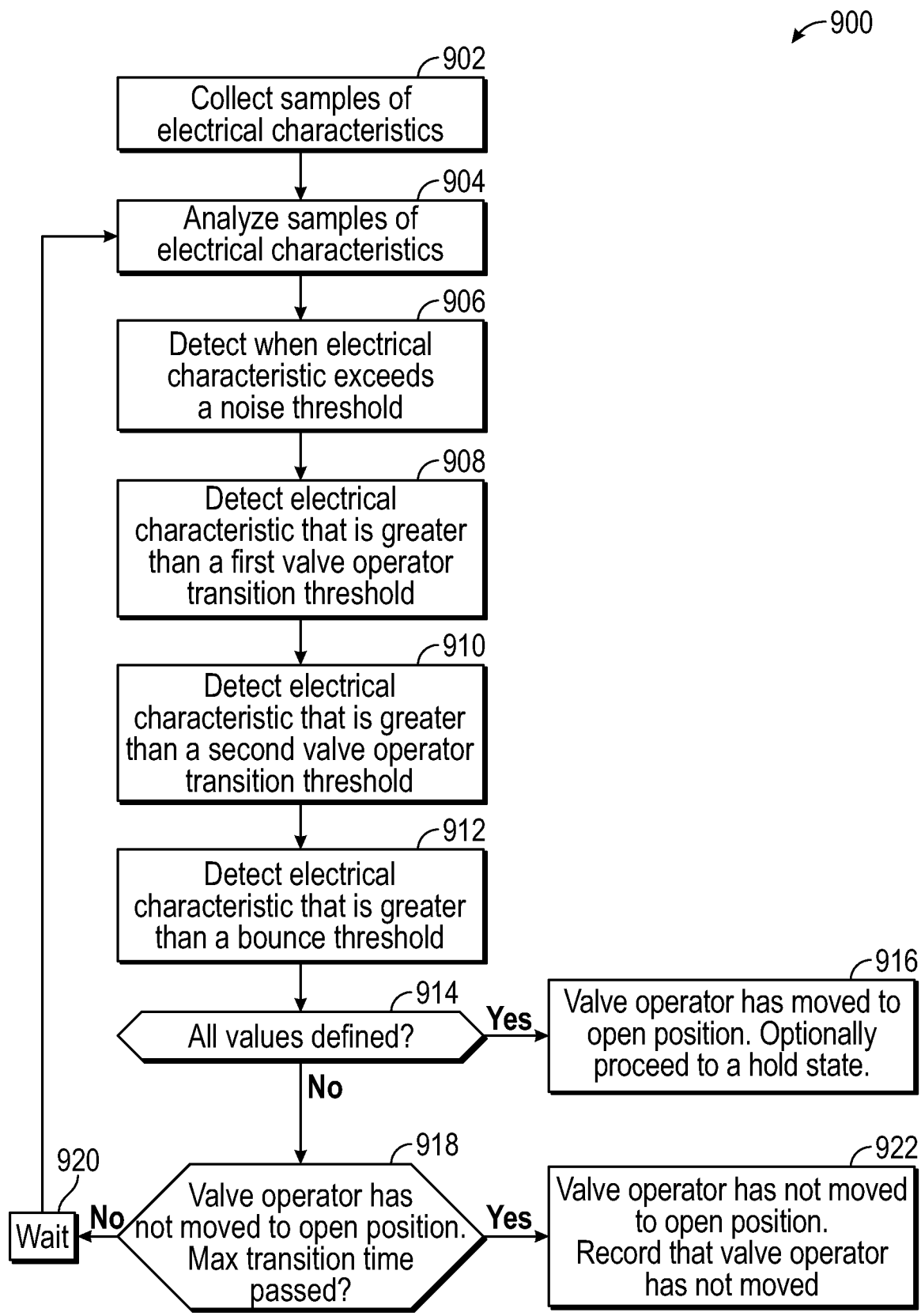
FIG. 9 illustrates an algorithm for determining one or more duty cycles, for example a duty cycle corresponding to a time duration for the valve operator transition between the closed position and the open position, according to an embodiment of the present subject matter.

FIG. 9 illustrates an algorithm 900 for determining one or more actual duty cycles, for example a duty cycle corresponding to a time duration for the valve operator 400 to transition between the closed position and the open position (e.g., the open stroke transition times). Samples are optionally collected during a first time interval (e.g., when the magnetic field is building in the solenoid 421), for example at 902. In an example, an analog-to-digital-converter ("ADC") with a direct memory access controller ("DMA") samples one or more electrical characteristics of the system 600, such as at a fixed sample rate. In an example, at 904 the electrical characteristic samples are analyzed, for instance with the controller 606 looping through an index of the samples to locate points of interest (e.g., one or more of the valve operator translation signatures 714). In another example, the controller 606 detects a value (e.g., one or more of the characteristics 704, 706) above a noise threshold (e.g., a base noise margin), and the controller 606 optionally records this as time T0. As the controller 606 continues analyzing the samples, at 906 the controller 606 optionally records the first instance of an inflection point (e.g., a peak, for instance the inflection point 710A at T1' in FIG. 7) that is greater than a first valve operator transition threshold (e.g., a noise threshold, minimum value, floor, or the like). In one example, T1' corresponds to the inflection point 710A and is, in some examples, more readily detected and T1' is accordingly interpreted as equivalent to T1. In another example, at 908 the controller 606 records an instance of a second inflection point (e.g., a valley, for example the inflection point 710B at T2 in FIG. 7) with a value that is greater than a second valve operator transition threshold. For instance, the second inflection point corresponds to the valve operator 400 fully moving to the open position (shown with the valve operator position 708 at T2 in FIG. 7).

The controller 606 optionally analyzes the samples (e.g., one or more of an analog signal, a digital signal, or the like) to detect a second peak value that exceeds the second valve operator transition value. For instance, the valve operator 400 may bounce within the valve body 402, thereby causing multiple peak values above the minimum valve operator transition value. Accordingly, at 910, the controller detects when the electrical characteristics exceed a bounce threshold to determine when the valve operator 400 has moved to the open position (e.g., the valve operator position 708 at T3, shown in FIG. 7).

The controller 606 determines when all values are defined at 914, such as by detecting when the value of the electrical characteristics of the system 600 exceed one or more of the thresholds described herein (e.g., a noise threshold, transition threshold, bounce threshold, or the like). At 916, when all values are defined, the controller 606 determines that the valve operator 400 did move (e.g., valve operator 400 is not stuck, bouncing, or the like) and proceeds to the hold state (e.g., by utilizing a hit-and-hold algorithm). If all values were not defined, at 918 the controller 606 determines that a full transition of the valve operator 400 did not occur and determines whether a wait duration has exceeded a maximum transition time threshold, such as a threshold correlating to the maximum hit duration of the hit-and-hold algorithm. In another example, the maximum transition time threshold correlates with a point when the field in the coil 420 is nearly saturated. If the wait duration has not exceeded the maximum transition time threshold, the controller 606 returns to 904 and analyzes samples of the electrical characteristics of the system 600. If the wait duration exceeds the maximum transition time threshold, the controller 606 determines that the valve operator 400 has not transitioned (e.g., the valve operator 400 is stuck or the operating pressure is too high) and the controller 606 records that the valve operator 400 did not transition.

In an example, the controller 606 when the controller 606 records that the valve operator 400 did not transition, the controller 606 provides a notification that the valve operator 400 did not transition (e.g., by displaying a message on a user interface, or the like). For example, the controller 606 transmits a notification to a user interface (e.g., a screen, dashboard, console, light emitting diode, pixel, or the like) to indicate to a user that the valve operator 400 did not transition. In another example, the notification provides the user with information that the duty cycle could not be implemented, for instance because the valve operator 400 remained open (or closed) instead of transitioning according to the specified duty cycle. Failure to implement the duty cycle is indicative in some examples of poor valve health, for example over or under application of an agricultural product, plugging, inability by the valve to achieve the specified duty cycle. A failure to implement the duty cycle triggers an implementation of a magnetic flux correction in one example. If the correction is implemented and performance is still out of line with the specified duty cycle a further indication is optionally provided of poor valve health.

Figure 10:
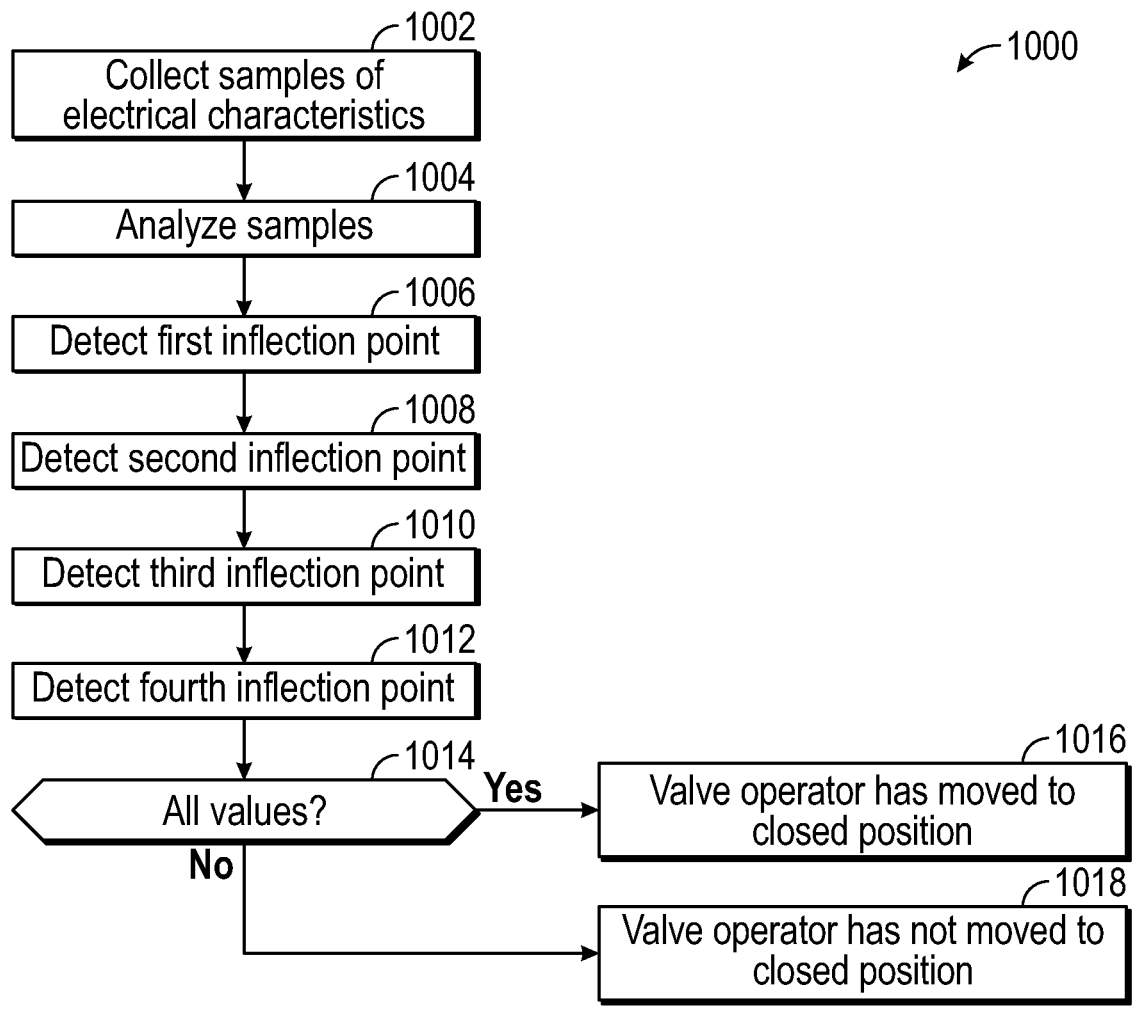
FIG. 10 illustrates an algorithm for determining one or more duty cycles, for example a duty cycle corresponding to a time duration for the valve operator transition between the open position and the closed position, according to an embodiment of the present subject matter.

FIG. 10 illustrates an algorithm 1000 for determining a translation of the valve operator 400 between the open position and the closed position (e.g., the close stroke transition times) in an example, at 1002 the controller 606 collects samples (e.g., data, information, electrical signals, or the like) during the translation of the valve operator 400 from the open position to the closed position. For instance, the controller 606 monitors a dissipation voltage node 626 during the close stroke. In an example, the controller 606 collects samples during a period of interest (e.g., when the magnetic field is decaying in the solenoid 621).

At 1004, the controller 606 analyzes the samples collected during translation of the valve operator 400. In some approaches, sampling the magnitudes of the sample values is unreliable at indicating valve operator 400 transition times. In an example, the controller 606 utilizes a derivative of the sample values (e.g., one or more electrical characteristics of the system 600, such as characteristics 704, 706) to determine whether the valve operator 400 has transitioned. The controller 606 optionally utilizes a stream derivative using, for instance a 9-sample window. For example, the controller 606 uses the Savitzky-Golay stream derivative method to compare one or more electrical characteristics of the system 600 to one or more of the valve operator translation signatures 714. In an example, as the stream derivative is calculated, the controller 606 analyzes the samples to look for one or more of the inflection points 710, 718 or the like in the electrical characteristics derivatives of the electrical characteristics) of the system 600. In another example, the valve operator translation signature 714 corresponds to one or more of the inflection points 710 of the coil characteristic 704. In yet another example, the valve operator translation signature 714 corresponds to one or more of the inflection points 718 of the dissipation characteristic 706. For instance, the inflection points 710, 718 include one or more of a change in magnitude of a derivative of the characteristic 704 (or the characteristic 706), such as an increase in the rate that the slope is decreasing; a change in sign of the slope of the characteristic 704 (or the characteristic 706); a change in sign of the derivative of characteristic 704 (or the characteristic 706); peaks and valleys; global maxima; global minima; local maxima; local minima; or the like.

In an example, at 1006 the controller 606 detects a first inflection point (e.g., a peak, such as inflection point 718A) in the collected samples, and the first inflection point correlates to the time (e.g., for the characteristic 706 at T5, shown in FIG. 7) when the current is directed to the second dissipation element 620 (and the voltage at the node 626 rises). At 1008, the controller 606 detects a second inflection point (e.g., a change in slope, for instance the inflection point 718B at T6 in FIG. 7), such as corresponding to a point when the second dissipation element 620 is no longer saturated. For instance, the second inflection point 718B is detected when the field decays below a clamped value of a clamp diode (e.g., for the characteristic 706 at T6, shown in FIG. 7). At 1010, the controller 606 detects a third inflection point (e.g., the inflection point 718C, shown in FIG. 7 at T7) indicating the point at which the valve operator 400 starts to transition to the closed position. In another example, the algorithm 1000 includes, at 1012, detecting a fourth inflection point (e.g., the inflection point 718D, shown in FIG. 7 at T8) with the controller 606. The fourth inflection point correlates to the point where the valve operator 400 has completed its transition to the closed position (indicated with the valve operator position 708 at T8 in FIG. 7). If all values are defined at 1014, at 1016 the controller 606 determines that the valve operator 400 did move (e.g., valve operator 400 is not stuck, bouncing, or the like) and optionally proceeds to the hold state. If all values were not recorded at 1014, at 1018 the controller 606 determines that a full transition of the valve operator 400 did not occur and optionally waits (e.g., for a waiting duration) before analyzing the electrical characteristics of the system 600 again. In some examples, the controller 606 determines that a full transition of the valve operator 400 did not occur and determines whether a wait duration has exceeded a maximum transition time threshold. The controller 606 optionally provides a notification when the wait duration exceeds the maximum transition time threshold.

FIG. 11 illustrates an algorithm 1100 for implementing a magnetic flux correction and implementing control of a valve according to a specified duty cycle 1102 and the magnetic flux correction (e.g., an applied duty cycle). In some examples, the algorithm 1100 is referred to as a feedback control loop 1100. In an example, at 1104 the controller 606 provides the specified duty cycle 1102 to a junction, such as a summation block 1106, and the output of the summation block 1106 is an applied duty cycle 1108 (e.g., the applied duty cycle 808, shown in FIG. 8). As described herein, in some examples, the duty cycle of the electrically controlled low side switch 614 controls the valve 304 mechanics and how much fluid flows from the valve 304 (and is dispensed by the nozzle 106). In an example, the specified duty cycle 701 (shown in FIG. 7) is associated with the actual duty cycle 713 of the valve 304. As described herein, in some approaches the actual duty cycle 713 does not match the specified duty cycle 701 (e.g., due to physical limitations in the construction of the valve 304). In an example, the system 600 corrects (including minimizes) the variation or error between the specified duty cycle 1102 and an actual duty cycle 1110 (e.g., as shown with the actual duty cycle 804'), such as with the algorithm 1100.

For instance, when the system 600 decreases variations in the open time of the valve 304 (between specified open and actual open), the controller 606 optionally increases the field generated by the coil 420. The increase in the generated field corresponds to an increase in power supplied to the coil 420. In some examples, variations between duty cycles are mitigated by monitoring the feedback of the coil characteristic sensor 604 and dissipation characteristic sensor 624, for instance to determine when the valve 304 actually transitions between the open position and the closed position (e.g., when the valve 304 actually strokes).

In an example, the controller 606 determines how the valve operator 400 actually moved for a cycle of the valve 304. The controller 606 compensates for variability in movement of the valve operator 400 (e.g., a difference between specified duty cycle and actual duty cycle) with an applied duty cycle 1108 that is based on the specified duty cycle with a magnetic flux correction. For example, at 1112, one or more of the switches 612, 614 are modulated according to the applied duty cycle 1108 (or specified duty cycle if no magnetic flux correction is present) to thereby open and close the valve 304. The corresponding actual duty cycle 1110 is the output of the modulated switching at 1112. The algorithm 1100 at 1114 includes determining the valve operator duty cycle. For example, the controller 606 monitors one or more characteristics, such as the electrical characteristics 704, 106 (that represent opening and closing of the valve), also referred to herein as the actual duty cycle 1110 (or the actual duty cycle 804 in FIG. 8).

In FIG. 11, at 1116 the algorithm 1100 includes determining a duty cycle correction 1118 (corresponding to the magnetic flux correction applied to the valve 304). The duty cycle correction 1118 is implemented with the specified duty cycle 1102 at the summation block 1106, thereby generating the applied duty cycle 1108. The controller 606 uses the actual duty cycle determination (e.g., with the algorithm 1100 at 1114) to guide the actual duty cycle 1110 toward the specified duty cycle 1102, thereby minimizing error between the specified duty cycle 1102 and the actual duty cycle 1110. In an example, factors that cause variability from valve to valve do not change dramatically from cycle to cycle for those respective valves. In some examples, the controller 606 utilizes a magnetic flux correction (or a duty cycle correction) to compensate the specified duty cycle 1102 of one or more valves 304 to improve the performance of the system 600 for applying an agricultural product. Accordingly, the variability between the valves 304 can be compensated for, such as by guiding the actual duty cycle 1110 of the valve 304 toward the specified duty cycle 1102.

For instance, at 1112, system feedback is conditioned into the duty cycle correction 1118 (e.g., an error offset, or the like) and used to modulate the low side switch 614 with the applied duty cycle 1108 that differs from the specified duty cycle 1102 to guide the actual duty cycle 1110 of the valve 304 to the specified duty cycle 1102. Accordingly, the system tightly controls the output of the valve 304 (e.g., flow of an agricultural product, or the like) based on a desired target output (e.g., valve flow rate, agricultural product volume or the like).

As described herein, at 1116, the controller 606 implementing the algorithm 1100 determines the duty cycle correction 1118 (e.g., a duration, percentage or the like that represents the magnetic flux correction) based on error (e.g., differences) between the specified duty cycle 1102 and the actual duty cycle 1110. The duty cycle correction 1118, when implemented at the coil 420 of the valve 304 corresponds to the magnetic flux correction. The duty cycle correction 1118 is combined with the specified duty cycle 1102 at the summation block 1104 to accordingly generate the applied duty cycle 1110. Accordingly, the duty cycle correction 1118 is applied to the specified duty cycle 1102 to generate the applied duty cycle 1108 that guides the valve performance (e.g., the actual duty cycle 804' described herein and shown in FIG. 8) to the original specified duty cycle 1102 (e.g., as provided at 1104). For instance, an 'on' duration (e.g., open period of the valve during a cycle of operation) for the actual duty cycle 804' corresponds with the 'on' duration of the specified duty cycle 1102 when the applied duty cycle 1108 includes the duty cycle correction 1118 (e.g., the magnetic flux correction).

As described herein, the controller 606 monitors feedback such as electrical characteristics that correspond to mechanical performance of the valve 304 as the valve operator transitions (e.g., between with an open stroke or a close stroke). The controller 606 optionally compiles one or more metrics related to valve health or valve performance relative to other valves in the system (e.g., to notify a user that performance of one or more of the valves is degraded, for instance below a performance threshold). In another example, the controller 606 compiles a health metric based on the correction, such as the magnetic flux correction or duty cycle correction 1118 (in FIG. 11), that adjusts valve performance toward the specified duty cycle 701. Optionally, the health metric is graduated according to the magnitude of the duty cycle correction 1118. For instance, as the duty cycle correction 1118 increases, the health metric conversely decreases (e.g., indicating the valve is less able to perform as specified and instead is driven with progressively greater correction).

For example, a magnitude of the duty cycle correction (e.g., determined with the algorithm 1100, shown in FIG. 11) is indicative of the health of the valve 304 (e.g., whether the valve 304 is operating as intended). In an example, the controller 606 determines that the valve 304 is performing as intended if the duty cycle correction 1118 is within 10 percent of the specified duty cycle 1102 (e.g., the duty cycle correction 1118 is within 0.010 ms for a specified duty cycle 1102 of 0.100 ms). Thus, when the duty cycle correction 1118 is within 10 percent of the specified duty cycle 1102, the controller 606 optionally provides a notification that the valve 304 is at maximum health. For instance, the controller 606 may provide a notification that a health value of the valve 304 is at 100 health points out of 100 total health points.

In another example, when the duty cycle correction 1118 exceeds 10 percent of the specified duty cycle (e.g., a duty cycle correction exceeding 0.010 ms for a duty cycle time of 0.100 ms), the controller 606 provides a notification that the health value of the valve 304 is decreasing. For example, the health value of the valve decreases below 100 total health points if the duty cycle correction 1118 exceeds 10 percent of the specified duty cycle 1102. The health value of the valve 304 optionally decreases in a graduated manner (e.g., linearly, exponentially, logarithmically, or the like) as the duty cycle correction 1118 increases above 10 percent of the specified duty cycle 1102. For example, the controller 606 provides a notification that the valve 304 has 50 health points (out of 100 total health points) when the duty cycle correction 1118 exceeds 15 percent of the specified duty cycle 1102 (e.g., the duty cycle correction exceeding 0.015 ms for a duty cycle time of 0.100 ms). In another example, the controller 606 provides a notification that the valve 304 has 0 health points (out of 100 total health points) when the duty cycle correction 1118 exceeds 20 percent of the specified duty cycle 1108 (e.g., the duty cycle correction exceeding 0.020 ms for a duty cycle time of 0.100 ms). In some examples, the controller 606 provides a notification that the valve 304 needs service, for instance when the duty cycle correction 1118 exceeds 25 percent of the specified duty cycle 1102 (e.g., the duty cycle correction exceeding 0.025 ms for a duty cycle time of 0.100 ms). Accordingly, the controller 606 utilizes the duty cycle correction 1118 to assess the health of the valve 304 and notify a user regarding the health of the valve (e.g., by displaying a health value including health points of the valve, or the system 600, with a user interface).

In some examples, pressure changes quickly at the valve outlet 416 once the seal is broken (on the open stroke) or sealed (on the close stroke). As the valves low output depends on the pressure at the outlet, the system provides a specified output when the system utilizes the subject matter described herein. For instance, the error offset metric is helpful for determining valve health between valves. The system provides operation conditions as similar as possible between valves of the system, and in some examples the system compares how much offset a given valve has and determines if the system is out of specifications (e.g., outlet restrictions in the case of blocked tip detection).

In some examples, a plumbing system of a sprayer has a pressure drop along the boom that varies from nozzle location to nozzle location that depends on the amount of flow going to each nozzle location. This variable pressure drop can cause issues, for example with our pressure control algorithm. In some approaches, the algorithm assumes that the pressure at each nozzle is the same as the pressure measured at the center of the boom. The variable pressure drop can also affect droplet size across the boom as the pressure at each nozzle location, for instance because the droplet size is dependent on nozzle pressure. To overcome controlling the flow incorrectly in the presence of this pressure drop, a controller integrates the system efficiency, but this adds latency to the control mechanism and can affect ow much variation in flow rate or droplet size occurs between locations on the boom.

The pressure drop at each location can be found through modeling known aspects of the machine configuration like the diameter(s) of the plumbing, length of the plumbing to each nozzle, types of tubing, types of restrictions or fittings along the boom, target flow rate at every nozzle location along the boom, and some characteristics about the type of liquid being dispensed. The system can experimentally validate pressure drop values on a configuration by running the system at a known flow rates at each nozzle and then measure the associated pressure drops along the boom. By modeling or characterizing the system, the system (e.g., a controller) can compensate the pressure at each nozzle to an average target pressure by controlling to an overall slightly higher pressure at the center of the machine. This pressure offset can still cause an issue with the inside nozzles having a higher than target pressure and dispensing more liquid and the outside nozzles having a lower than target pressure and dispensing slightly less liquid. The effective pressure could be calculated at each nozzle or valve, and then the system can compensate the flow rate by adjusting the duty cycle of the valves or nozzles to match their target flow rate even in the presence of the nominal pressure drop at their location.

In some approaches a sprayer for applying an agricultural product can cause skips, or areas in application coverage that do not get touched by dispensed agrochemical, for instance if the driven duty cycle of a nozzle is less than 50%. In practice, this number is 50% because nozzle tips are generally selected to overlap 50% with their neighboring nozzle and nozzles are run out of phase with one another. Many things affect the skip area like machine speed, yaw rate, application height, mixing in the air due to boom or machine turbulence or local wind conditions. The total area of the skip depends on one or more things, the effective velocity at the nozzle, the application width of the tip, and the off time of the nozzle when operating at less than 50% duty cycle.

The area can be calculated using the following formula:

Skip Area=(Nozzle Width*Effective Nozzle Velocity*(1−(duty cycle/100))/frequency [for duty cycles<50%]

In practice, we currently recommend keeping our valve ("NCV") minimum duty cycle at or around 25% to minimize areas where skips may occur. However, the NCV can physically perform well at much lower duty cycles as the limitation in the NCV is how quickly the valve operator 400 can transition from the closed to open states or opened to close states. For instance, at 40 PSI, the NCV can open in about 7 ms and close in about 5 ms. At a frequency of 10 Hz this correlates to a minimum on-time duty cycle of about 5% and at 20 Hz, this correlates to a minimum on-time duty cycle of 10%. In general, if the frequency was increased near the minimum duty cycle range to 20 Hz it would cause the skip distance to decrease and increase our confidence at lowering the NCV minimum duty cycle threshold. In the industry, the trend is to increase the base operational frequency at all duty cycles in order to minimize skip area or distance. However, increasing the frequency causes more stress on the physical mechanics of the NCV (like the valve operator 400 and seals), and in return, lowering the frequency would lengthen the lifespan of the NCV. Increasing the frequency also causes more transitions from the open to closed and closed to open states during which the pressure in the valve varies and can cause non-linear flow or pressure drops which can affect control and target droplet size.

Therefore, being able to dynamically adjust the operational frequency of the NCV at different duty cycles and effective velocities to target a minimum skip area would be ideal for targeting an optimal life time, minimizing inconsistencies in droplet size from the tip, or minimizing time in non-linear flow rate application periods.

Technically, the frequency at any duty cycle above 50% could be reduced to the lowest allowable frequency that still produced an acceptable coverage pattern (e.g., acceptably sized double-coverage areas). One approach to implement dynamic frequency adjustment can be that the frequency is fixed at set duty cycles and then would use a percent threshold to switch between the frequencies. This approach has the disadvantage of the fact that it doesn't use the effective nozzle velocity to minimize the skip distance, which may make it unnecessarily run at higher frequencies when it doesn't need to do so to acceptably minimize skip coverage areas.

Another way would be to have the user select a maximum skip distance and then based off that setting, each NCV could use its effective speed and off time to determine its effective skip distance and make a decision to increase or decrease the frequency to control the skip distance below the maximum entered value.

It is also worth noting that because nozzles typically run out of phase with their neighbors, frequency steps would have to happen in powers of two to ensure that nozzles could still be synced locally to one another and remain out of phase.

Figure 12:
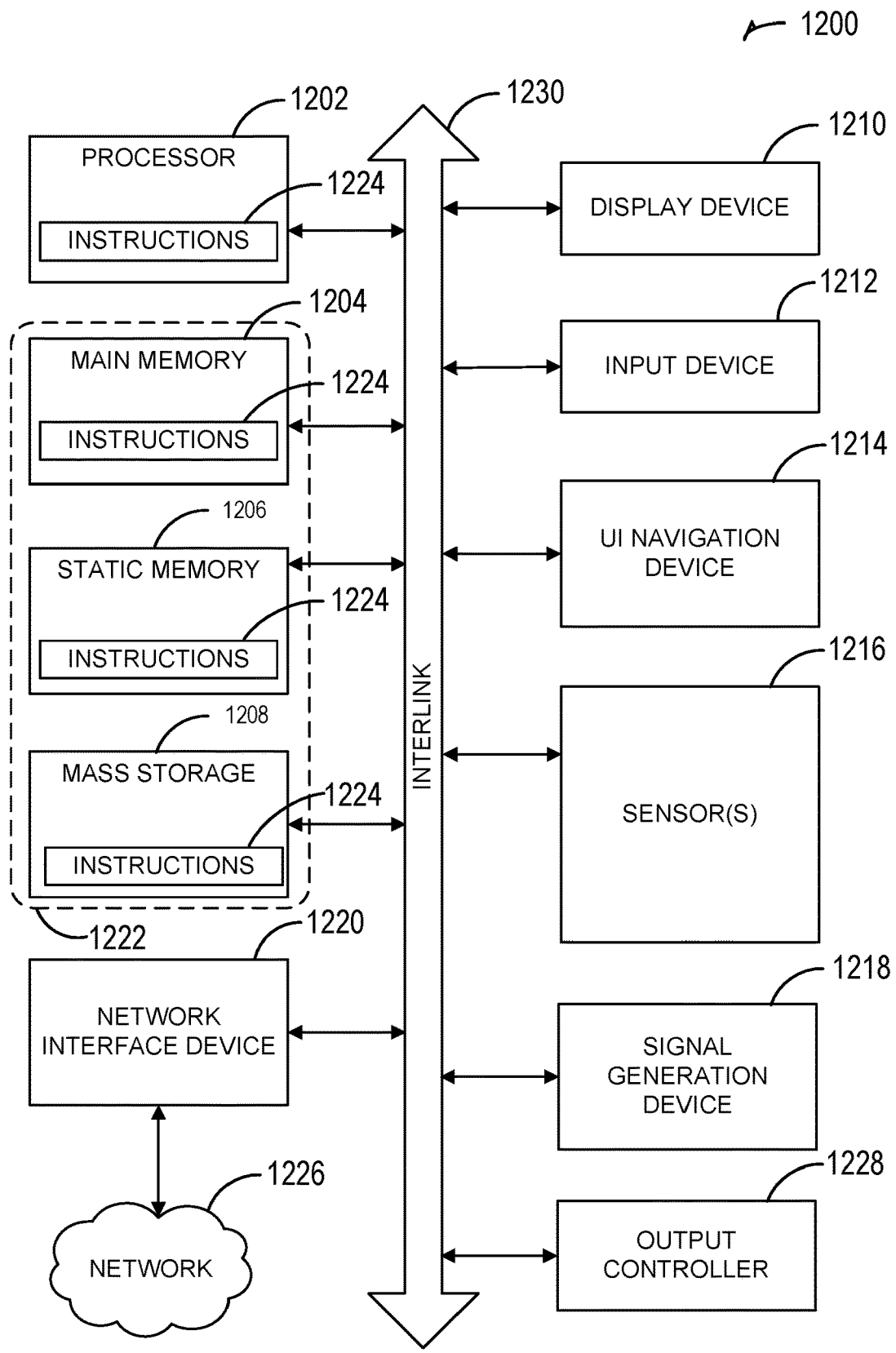
FIG. 12 illustrates a block diagram of an example machine upon which any one or more of the techniques discussed herein may perform, according to an embodiment of the present subject matter.

FIG. 12 illustrates a block diagram of an example machine 1200 (e.g., the controller 606, or the like) upon which any one or more of the techniques (e.g., methodologies) discussed herein may perform, for example one or more of the algorithms 801, 900, 1000, or 1100. Examples, as described herein, may include, or may operate by, logic or a number of components, or mechanisms in the machine 1200. Circuitry (e.g., processing circuitry) is a collection of circuits implemented in tangible entities of the machine 1200 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1200 follow.

In alternative embodiments, the machine 1200 may operate as a standalone device or may be connected (e.g., networked) to other machines. In a networked deployment, the machine 1200 may operate in the capacity of a server machine, a client machine, or both in server-client network environments. In an example, the machine 1200 may act as a peer machine in peer-to-peer (P2P) (or other distributed) network environment. The machine 1200 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1200 may include a hardware processor 1202 (e.g., a central processing unit (CPU), a graphics processing unit (GPU), a hardware processor core, or any combination thereof), a main memory 1204, a static memory (e.g., memory or storage for firmware, microcode, a basic-input-output (BIOS), unified extensible firmware interface (UEFI), etc.) 1206, and mass storage 1208 (e.g., hard drive, tape drive, flash storage, or other block devices) some or all of which may communicate with each other via an interlink (e.g., bus) 1230. The machine 1200 may further include a display unit 1210, an alphanumeric input device 1212 (e.g., a keyboard), and a user interface (UI) navigation device 1214 (e.g., a mouse). In an example, the display unit 1210, input device 1212 and UI navigation device 1214 may be a touch screen display. The machine 1200 may additionally include a storage device (e.g., drive unit) 1208, a signal generation device 1218 (e.g., a speaker), a network interface device 1220, and one or more sensors 1216, such as a global positioning system (GPS) sensor, compass, accelerometer, or other sensor. The machine 1200 may include an output controller 1228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1202, the main memory 1204, the static memory 1206, or the mass storage 1208 may be, or include, a machine readable medium 1222 on which is stored one or more sets of data structures or instructions 1224 (e.g., software) embodying or utilized by any one or more of the techniques or functions described herein. The instructions 1224 may also reside, completely or at least partially, within any of registers of the processor 1202, the main memory 1204, the static memory 1206, or the mass storage 1208 during execution thereof by the machine 1200. In an example, one or any combination of the hardware processor 1202, the main memory 1204, the static memory 1206, or the mass storage 1208 may constitute the machine readable media 1222. While the machine readable medium 1222 is illustrated as a single medium, the term "machine readable medium" may include a single medium or multiple media (e.g., a centralized or distributed database, and/or associated caches and servers) configured to store the one or more instructions 1224.

The term "machine readable medium" may include any medium that is capable of storing, encoding, or carrying instructions for execution by the machine 1200 and that cause the machine 1200 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1224 may be further transmitted or received over a communications network 1226 using a transmission medium via the network interface device 1220 utilizing any one of a number of transfer protocols (e.g., frame relay, internet protocol (IP), transmission control protocol (TCP), user datagram protocol (MP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., institute of Electrical and Electronics Engineers (IEEE) 802.11 family of standards known as Wi-Fi®), IEEE 802.16 family of standards known as WiMax®), IEEE 802.15.4 family of standards, peer-to-peer (P2P) networks, among others. In an example, the network interface device 1220 may include one or more physical jacks (e.g., Ethernet, coaxial, or phone jacks) or one or more antennas to connect to the communications network 1226. In an example, the network interface device 1220 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1200, and includes digital or analog communications signals or other intangible medium to facilitate communication of such software. A transmission medium is a machine readable medium.

Figure 13:
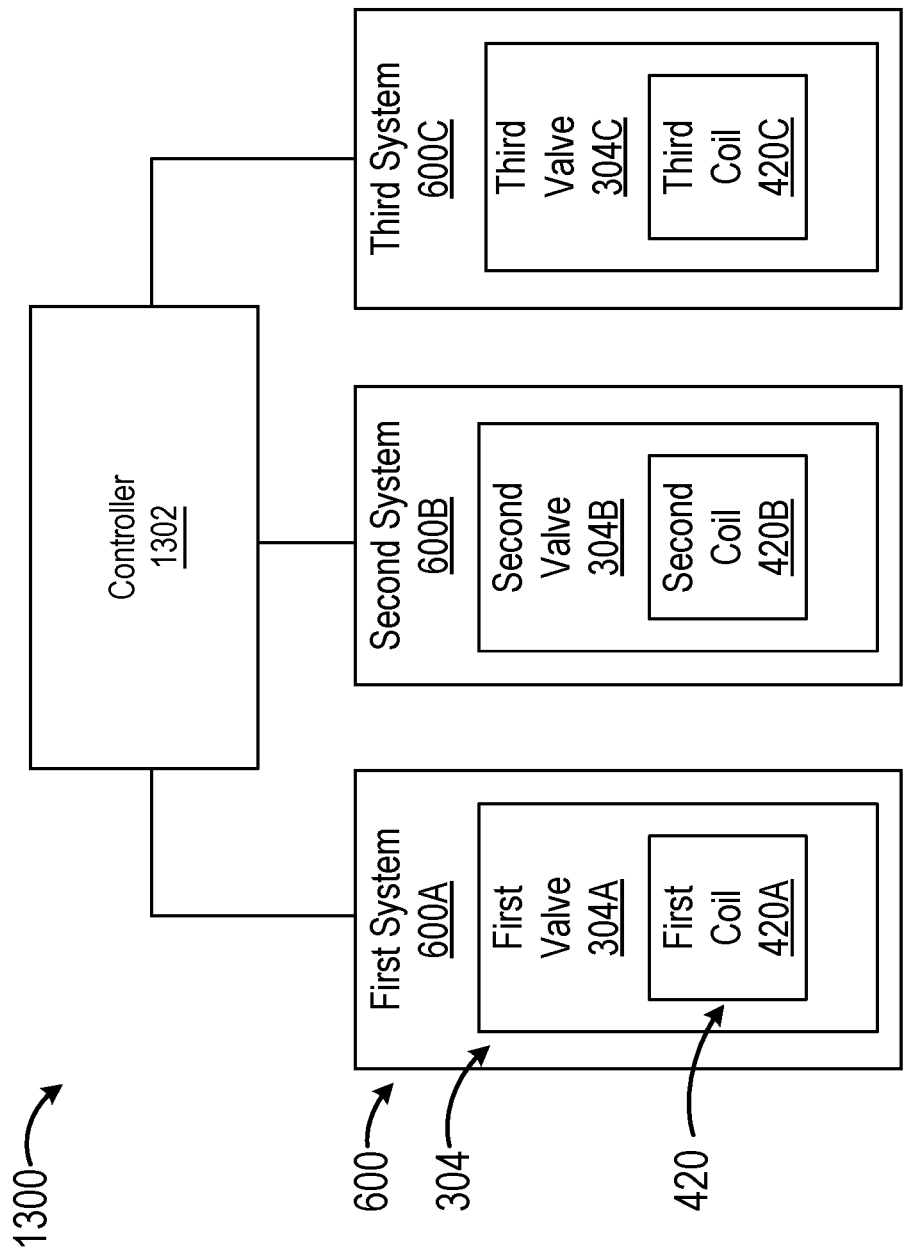
FIG. 13 illustrates a schematic diagram of an example of a system for modulating one or more of valves, according to an embodiment of the present subject matter.

FIG. 13 illustrates a schematic diagram of an example of a system 1300 for modulating one or more of the valves 304. For example, the system 1300 includes the controller 1302. In some examples, the controller 1302 includes the controller 606. For instance, the controller 1302 includes processing circuitry that facilitates operation of the system 1300 (and the valves 304). In an example, the agricultural sprayer 100 (shown in FIG. 1) includes one or more controllers, for instance one or more of the controller 1302 or the controller 606 (shown in FIG. 6). In another example, the nozzle control system 200 (shown in FIG. 2) includes the controllers (e.g., controller 1302, controller 606, or the like). In yet another example, the control system 300 (shown in FIG. 3) includes the controllers e.g., (controller 1302, controller 606, or the like).

In an example, the controller 1302 is in communication with one or more of the nozzle control systems 600. For instance, the system 1300 includes a first nozzle control system 600A, a second nozzle control system 600B, and a third nozzle control system 600C. The first system 600A includes a first valve 304A having a first coil 420A. The second system 600B includes a second valve 304B having a second coil 420B. The third system 600C includes a third valve 304C having a third coil 420C. The controller 1302 modulates the valves 304 according to one or more duty cycles. For example, the controller 1302 is in communication with the first system 600A and energizes the coil 420A, for instance according to a first specified duty cycle and a first magnetic flux correction. The controller 1302 is in communication with the second system 600B and energizes the coil 420B, for instance according to a second specified duty cycle and a second magnetic flux correction. The controller 1302 is in communication with the third system 600C and energizes the coil 420C, for instance according to a third specified duty cycle and a third magnetic flux correction. Accordingly, the controller 1302 operates the valves 304.

In some examples, the controller 1302 facilitates modulation of one or more of the valves 304 out of phase with each other, for instance to conserve power usage by the system 1300. For example, the first valve 304A is modulated out of phase with the second valve 304B. The first valve 304A is modulated out of phase with the third valve 304C. Accordingly, the first valve 304A is modulated out of phase with one or more of the second valve 304B or the third valve 304C. In another example, the second valve 304B is operated in phase with the third valve 3040. The first valve 304A is modulated out of phase with the second valve 304B and the third valve 304C (with the valves 304B, 304C modulated in phase with each other). Accordingly, modulation of the valves 304 out of phase with each other reduces the number of valves 304 that are drawing power simultaneously within the system 1300.

In an example, the controller 1302 modulates the first valve 304A out of phase with the second valve 304B at a specified phase. The controller 1302 operates the valve 304A, for example by operating a moveable valve operator (e.g., valve operator 400, shown in FIG. 4) with the coil 420A. The controller 1302 optionally determines an actual phase of the valve 304, such as by determining the actual duty cycles of the valves 304 and determining the actual phase between the actual duty cycles of the valves 304. The controller 1302 operates the valve 304A according to the specified duty cycle and a magnetic flux correction (e.g., an applied duty cycle) to guide the actual phase of the valve 304A toward the specified phase. For instance, the controller 1302 determines an error between the specified phase and the actual phase of the valves 304. The controller 1302 implements a correction to the modulation of the valves 304, for example to reduce or minimize) error between the specified phase and the actual phase of the valves 304.

Various Notes & Aspects

Aspect 1 is a system for applying an agricultural product, the system comprising: a valve including a solenoid, the valve including: a coil configured to generate a magnetic flux; a moveable valve operator configured to translate with respect to the coil based on the magnetic flux, wherein the valve operator translates between a closed position and an open position according to a specified magnetic flux associated with a specified duty cycle, wherein: in the closed position, the valve operator is configured to prevent flow through the valve; and in the open position, the valve operator is configured to permit flow through the valve; a dissipation element having a dissipation characteristic and configured to dissipate energy from the coil; and a valve controller, including processing circuitry configured to: measure one or more electrical characteristics of at least one of the coil or the dissipation element; determine an actual duty cycle of the valve operator using the measured electrical characteristics; determine a magnetic flux correction based on a difference between the actual duty cycle and the specified duty cycle; and operate the valve operator according to the specified magnetic flux and the magnetic flux correction to guide the actual duty cycle toward the specified duty cycle.

In Aspect 2, the subject matter of Aspect 1 optionally includes wherein determining actual duty cycle of the valve operator using the measured electrical characteristics includes: comparing the electrical characteristics to a valve operator translation signature to determine a translation start time and a translation stop time of the valve operator; and determining the difference between the translation start time and the translation stop time.

In Aspect 3, the subject matter of Aspect 2 optionally includes wherein the valve operator translation signature includes a characteristic change threshold, and comparing the electrical characteristics to the valve operator translation signature includes: determining a change in the electrical characteristics; comparing the change in the electrical characteristics to the electrical characteristic change threshold; and wherein the controller records one or more of the translation start time and the translation stop time based on the comparison of the change in the electrical characteristics to the electrical characteristic change threshold.

In Aspect 4, the subject matter of Aspect 3 optionally includes wherein electrical characteristic change threshold is a current threshold, and the controller records the translation start time when a change in a coil current of the coil exceeds the current threshold.

In Aspect 5, the subject matter of any one or more of Aspects 3-4 optionally include wherein the electrical characteristic change threshold is a voltage threshold, and the controller records the translation stop time when a change in a dissipation element voltage of the dissipation element exceeds the voltage threshold.

In Aspect 6, the subject matter of any one or more of Aspects 2-5 optionally include wherein the valve operator translation signature includes: a characteristic change threshold; a first characteristic inflection where a current of the coil decreases; a second characteristic inflection where the current of the coil increases, and wherein the controller records one or more of the translation start time and the translation stop time when the difference between the current of the coil at the first characteristic inflection and the current of the coil at the second characteristic inflection exceeds the characteristic change threshold.

In Aspect 7, the subject matter of any one or more of Aspects 2-6 optionally include wherein the valve operator translation signature includes: a characteristic change threshold; a first characteristic inflection where a voltage of the dissipation element increases; a second characteristic inflection where the voltage of the dissipation element decreases, and wherein the controller records one or more of the translation start time and the translation stop time when the difference between the voltage of the dissipation element at the first characteristic inflection and the voltage of the dissipation element at the second characteristic inflection exceeds the characteristic change threshold.

In Aspect 8, the subject matter of any one or more of Aspects 2-7 optionally include wherein the valve operator translation signature includes: a characteristic change threshold; a first characteristic inflection where a voltage of the dissipation element increases; a second characteristic inflection where the voltage of the dissipation element decreases, and wherein the controller records one or more of the translation start time and the translation stop time when the voltage of the dissipation element changes at a rate greater than the characteristic change threshold.

In Aspect 9, the subject matter of any one or more of Aspects 1-8 optionally include wherein the coil electrical characteristics include one or more of a coil current or a coil voltage.

In Aspect 10, the subject matter of any one or more of Aspects 1-9 optionally include wherein the dissipation element electrical characteristics include one or more of a dissipation element current or a dissipation element voltage.

In Aspect 11, the subject matter of any one or more of Aspects 1-10 optionally include wherein: the coil generates the magnetic flux in response to a coil control signal generated by the controller; and the specified duty cycle corresponds to a difference between a first time interval when the controller begins generating the coil control signal and a second time interval when the controller stops generating the coil control signal.

In Aspect 12, the subject matter of any one or more of Aspects 1-11 optionally include wherein: the coil generates the magnetic flux in response to a coil control signal generated by the controller; and the controller is configured to modulate the coil control signal when the valve operator is located in the open position.

In Aspect 13, the subject matter of any one or more of Aspects 1-12 optionally include wherein moveable valve operator includes a poppet.

In Aspect 14, the subject matter of any one or more of Aspects 1-13 optionally include wherein: the valve operator is biased toward the closed position; and the magnetic flux generated by the coil is configured to overcome the bias of the valve operator to translate the valve operator from closed position to the open position.

In Aspect 15, the subject matter of any one or more of Aspects 1-14 optionally include wherein: the valve operator is biased toward the open position; and the magnetic flux generated by the coil is configured to overcome the bias of the valve operator to translate the valve operator from open position to the closed position.

In Aspect 16, the subject matter of any one or more of Aspects 1-15 optionally include wherein operating the valve operator according to the specified magnetic flux includes operating the valve operator with an electrical signal corresponding to the specified magnetic flux.

In Aspect 17, the subject matter of any one or more of Aspects 1-16 optionally include a frame configured to concentrate the magnetic flux on the moveable valve operator.

In Aspect 18, the subject matter of any one or more of Aspects 1-17 optionally include wherein the dissipation element is TVS diode.

Aspect 19 is a system for applying an agricultural product, the system comprising: a first valve including a first solenoid, the valve including: a first coil configured to generate a magnetic flux; a first moveable valve operator configured to translate with respect to the coil based on the magnetic flux, wherein the valve operator translates between a closed position and an open position according to a specified magnetic flux associated with a specified duty cycle, wherein: in the closed position, the valve operator is configured to prevent flow through the valve; and in the open position, the valve operator is configured to permit flow through the valve; a second valve including a second solenoid, a second coil, and a second moveable operator; a dissipation element having a dissipation characteristic and configured to dissipate energy from the coil; and a valve controller, including processing circuitry configured to: measure one or more electrical characteristics of at least one of the first coil, the second coil, or the dissipation element; determine an actual duty cycle of one or more of the first valve operator or the second valve operator using the measured electrical characteristics; determine a magnetic flux correction based on a difference between the actual duty cycle and the specified duty cycle; and operate one or more of the first or second valve operators according to the specified magnetic flux and the magnetic flux correction to guide the actual duty cycle toward the specified duty cycle.

Aspect 20 is a system for applying an agricultural product, the system comprising: a first valve including a first solenoid, the valve including: a first coil configured to generate a magnetic flux; a first moveable valve operator configured to translate with respect to the coil based on the magnetic flux, wherein the valve operator translates between a closed position and an open position according to a specified magnetic flux associated with a specified duty cycle, wherein: in the closed position, the valve operator is configured to prevent flow through the valve; and in the open position, the valve operator is configured to permit flow through the valve; a second valve including a second solenoid, a second coil, and a second moveable operator; a dissipation element having a dissipation characteristic and configured to dissipate energy from one or more of the first coil or the second coil; and a valve controller, including processing circuitry configured to: measure one or more electrical characteristics of at least one of the first coil, the second coil, or the dissipation element; determine an actual duty cycle of one or more of the first valve operator or the second valve operator using the measured electrical characteristics; determine a magnetic flux correction based on a difference between the actual duty cycle and the specified duty cycle; and wherein the first valve is modulated out of phase with the second valve at a specified phase and the controller operates the first moveable valve operator according to the specified magnetic flux and the magnetic flux correction to guide an actual phase of one or more of the first valve or the second valve toward the specified phase.

Aspect 21 may include or use, or may optionally be combined with any portion or combination of any portions of any one or more of Aspects 1 through 20 to include or use, subject matter that may include means for performing any one or more of the functions of Aspects 1 through 20, or a machine-readable medium including instructions that, when performed by a machine, cause the machine to perform any one or more of the functions of Aspects 1 through 20.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of consistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above. Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A system for applying an agricultural product, the system comprising:
   a valve including a solenoid, the valve including:
      a coil configured to generate a magnetic flux;
      a moveable valve operator configured to translate with respect to the coil based on the magnetic flux, wherein the valve operator translates between a closed position and an open position according to a specified magnetic flux associated with a specified duty cycle, wherein:
         in the closed position, the valve operator is configured to prevent flow through the valve; and
         in the open position, the valve operator is configured to permit flow through the valve;
   a dissipation element having a dissipation characteristic and configured to dissipate energy from the coil; and
   a valve controller, including processing circuitry configured to:
      measure one or more electrical characteristics of at least one of the coil or the dissipation element;
      determine an actual duty cycle of the valve operator using the measured electrical characteristics;
      determine a magnetic flux correction based on a difference between the actual duty cycle and the specified duty cycle; and
      operate the valve operator according to the specified magnetic flux and the magnetic flux correction to guide the actual duty cycle toward the specified duty cycle.

2. The system of claim 1, wherein determining actual duty cycle of the valve operator using the measured electrical characteristics includes:
   comparing the electrical characteristics to a valve operator translation signature to determine a translation start time and a translation stop time of the valve operator; and
   determining the difference between the translation start time and the translation stop time.

3. The system of claim 2, wherein the valve operator translation signature includes a characteristic change threshold, and comparing the electrical characteristics to the valve operator translation signature includes:
   determining a change in the electrical characteristics;
   comparing the change in the electrical characteristics to the electrical characteristic change threshold; and
   wherein the controller records one or more of the translation start time and the translation stop time based on the comparison of the change in the electrical characteristics to the electrical characteristic change threshold.

4. The system of claim 3, wherein electrical characteristic change threshold is a current threshold, and the controller records the translation start time when a change in a coil current of the coil exceeds the current threshold.

5. The system of claim 3, wherein the electrical characteristic change threshold is a voltage threshold, and the controller records the translation stop time when a change in a dissipation element voltage of the dissipation element exceeds the voltage threshold.

6. The system of claim 2, wherein the valve operator translation signature includes:
   a characteristic change threshold;
   a first characteristic inflection where a current of the coil decreases;
   a second characteristic inflection where the current of the coil increases, and
   wherein the controller records one or more of the translation start time and the translation stop time when the difference between the current of the coil at the first characteristic inflection and the current of the coil at the second characteristic inflection exceeds the characteristic change threshold.

7. The system of claim 2, wherein the valve operator translation signature includes:
   a characteristic change threshold;
   a first characteristic inflection where a voltage of the dissipation element increases;
   a second characteristic inflection where the voltage of e dissipation element decreases, and
   wherein the controller records one or more of the translation start time and the translation stop time when the difference between the voltage of the dissipation element at the first characteristic inflection and the voltage of the dissipation element at the second characteristic inflection exceeds the characteristic change threshold.

8. The system of claim 2, wherein the valve operator translation signature includes:
   a characteristic change threshold;
   a first characteristic inflection where a voltage of the dissipation element increases;
   a second characteristic inflection where the voltage of the dissipation element decreases, and
   wherein the controller records one or more of the translation start time and the translation stop time when the voltage of the dissipation element changes at a rate greater than the characteristic change threshold.

9. The system of claim 1, wherein the coil electrical characteristics include one or more of a coil current or a coil voltage.

10. The system of claim 1, wherein the dissipation element electrical characteristics include one or more of a dissipation element current or a dissipation element voltage.

11. The system of claim 1, wherein:
   the coil generates the magnetic flux in response to a coil control signal generated by the controller; and
   the specified duty cycle corresponds to a difference between a first time interval when the controller begins generating the coil control signal and a second time interval when the controller stops generating the coil control signal.

12. The system of claim 1, wherein:
   the coil generates the magnetic flux in response to a coil control signal generated by the controller; and
   the controller is configured to modulate the coil control signal when the valve operator is located in the open position.

13. The system of claim 1, wherein moveable valve operator includes a poppet.

14. The system of claim 1, wherein:
   the valve operator is biased toward the closed position; and the magnetic flux generated by the coil is configured to overcome the bias of the valve operator to translate the valve operator from closed position to the open position.

15. The system of claim 1, wherein:

the valve operator is biased toward the open position; and the magnetic flux generated by the coil is configured to overcome the bias of the valve operator to translate the valve operator from open position to the closed position.

16. The system of claim 1, wherein operating the valve operator according to the specified magnetic flux includes operating the valve operator with an electrical signal corresponding to the specified magnetic flux.

17. The system of claim 1, further comprising a frame configured to concentrate the magnetic flux on the moveable valve operator.

18. The system of claim 1, wherein the dissipation element is a TVS diode.

19. A system for applying an agricultural product, the system comprising:
- a first valve including a first solenoid, the valve including:
  - a first coil configured to generate a magnetic flux;
  - a first moveable valve operator configured to translate with respect to the coil based on the magnetic flux, wherein the valve operator translates between a closed position and an open position according to a specified magnetic flux associated with a specified duty cycle, wherein:
    - in the closed position, the valve operator is configured to prevent flow through the valve; and
    - in the open position, the valve operator is configured to permit flow through the valve;
- a second valve including a second solenoid, a second coil, and a second moveable operator;
- a dissipation element having a dissipation characteristic and configured to dissipate energy from the coil; and
- a valve controller, including processing circuitry configured to:
  - measure one or more electrical characteristics of at least one of the first coil, the second coil, or the dissipation element;
  - determine an actual duty cycle of one or more of the first valve operator or the second valve operator using the measured electrical characteristics;
  - determine a magnetic flux correction based on a difference between the actual duty cycle and the specified duty cycle; and
  - operate one or more of the first or second valve operators according to the specified magnetic flux and the magnetic flux correction to guide the actual duty cycle toward the specified duty cycle.

20. A system for applying an agricultural product, the system comprising:
- a first valve including a first solenoid, the valve including:
  - a first coil configured to generate a magnetic flux;
  - a first moveable valve operator configured to translate with respect to the coil based on the magnetic flux, wherein the valve operator translates between a closed position and an open position according to a specified magnetic flux associated with a specified duty cycle, wherein:
    - in the closed position, the valve operator is configured to prevent flow through the valve; and
    - in the open position, the valve operator is configured to permit flow through the valve;
- a second valve including a second solenoid, a second coil, and a second moveable operator;
- a dissipation element having a dissipation characteristic and configured to dissipate energy from one or more of the first coil or the second coil; and
- a valve controller, including processing circuitry configured to:
  - measure one or more electrical characteristics of at least one of the first coil, the second coil, or the dissipation element;
  - determine an actual duty cycle of one or more of the first valve operator or the second valve operator using the measured electrical characteristics;
  - determine a magnetic flux correction based on a difference between the actual duty cycle and the specified duty cycle; and
  - wherein the first valve is modulated out of phase with the second valve at a specified phase and the controller operates the first moveable valve operator according to the specified magnetic flux and the magnetic flux correction to guide an actual phase of one or more of the first valve or the second valve toward the specified phase.

* * * * *